United States Patent
Surcouf et al.

(10) Patent No.: US 11,838,361 B2
(45) Date of Patent: Dec. 5, 2023

(54) REDUCING DISTRIBUTED STORAGE OPERATION LATENCY USING SEGMENT ROUTING TECHNIQUES

(71) Applicant: Cisco Technology, Inc., San Jose, CA (US)

(72) Inventors: Andre Jean-Marie Surcouf, St. Leu la Foret (FR); Guillaume Ruty, Paris (FR); Mohammed Hawari, Montigny-le-Bretonneux (FR); Aloÿs Christophe Augustin, Versailles (FR); Yoann Desmouceaux, Paris (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/547,766

(22) Filed: Dec. 10, 2021

(65) Prior Publication Data

US 2022/0103631 A1 Mar. 31, 2022

Related U.S. Application Data

(63) Continuation of application No. 17/132,125, filed on Dec. 23, 2020, which is a continuation of application (Continued)

(51) Int. Cl.
*H04L 67/1097* (2022.01)
*H04L 67/1095* (2022.01)
(Continued)

(52) U.S. Cl.
CPC ...... *H04L 67/1097* (2013.01); *H04L 67/1001* (2022.05); *H04L 67/1095* (2013.01); *H04L 67/01* (2022.05)

(58) Field of Classification Search
CPC ... H04L 45/34; H04L 45/745; H04L 61/6059; H04L 67/1002; H04L 69/22;
(Continued)

(56) References Cited

U.S. PATENT DOCUMENTS 6,223,206 B1   4/2001 Dan et al.
6,856,991 B1   2/2005 Srivastava
(Continued)

FOREIGN PATENT DOCUMENTS

CN   102333120 A   1/2012
EP   E P-3349132 A1 *  7/2018  ........... G06F 16/122
(Continued)

OTHER PUBLICATIONS

"Segment Routing Configuration Guide, Cisco IOS XE Everest 16.5," 2018 Cisco Systems, Inc. pp. 1-176.
(Continued)

*Primary Examiner* — Shean Tokuta
(74) *Attorney, Agent, or Firm* — Polsinelli

(57) ABSTRACT

Systems, methods, and computer-readable media for reducing distributed storage operation latency using segment routing. In some examples, a method can involve receiving, from a client, a message identifying an intent to store or retrieve data on a distributed storage environment, and sending to the client a segment routing (SR) list identifying storage node candidates for storing or retrieving the data. The method can involve steering a data request from the client through a path defined by the SR list based on a segment routing header (SRH) associated with the request, the SRH being configured to steer the request through the path until a storage node from the storage node candidates accepts the request. The method can further involve sending, to the client device, a response indicating that the storage
(Continued)

node has accepted the request and storing or retrieving the data at the storage node that accepted the request.

26 Claims, 16 Drawing Sheets

Related U.S. Application Data

No. 16/121,525, filed on Sep. 4, 2018, now Pat. No. 10,904,335.

(51) Int. Cl.
*H04L 67/1001* (2022.01)
*H04L 67/01* (2022.01)

(58) Field of Classification Search
CPC . H04L 67/1097; H04L 67/1095; H04L 67/42; G06F 16/164
See application file for complete search history.

(56) References Cited

U.S. PATENT DOCUMENTS

| | | | |
|---|---|---|---|
| 2014/0269422 A1* | 9/2014 | Filsfils | H04L 45/54 370/254 |
| 2015/0248253 A1 | 9/2015 | Kim et al. | |
| 2015/0256456 A1* | 9/2015 | Previdi | H04L 45/745 370/392 |
| 2016/0021400 A1* | 1/2016 | Surcouf | H04N 21/26258 725/93 |
| 2017/0026224 A1* | 1/2017 | Townsley | H04L 45/64 |
| 2017/0250908 A1* | 8/2017 | Nainar | H04L 45/04 |
| 2017/0251073 A1 | 8/2017 | Raghunath et al. | |
| 2017/0302552 A1* | 10/2017 | Ward | H04N 21/23439 |
| 2017/0302575 A1 | 10/2017 | Ward et al. | |
| 2018/0034727 A1* | 2/2018 | Nainar | H04L 45/74 |
| 2018/0131616 A1 | 5/2018 | LaBerge et al. | |
| 2018/0203866 A1* | 7/2018 | Surcouf | H04L 67/1097 |
| 2018/0219783 A1* | 8/2018 | Pfister | H04L 67/1027 |
| 2018/0302490 A1* | 10/2018 | Surcouf | G06N 20/00 |
| 2019/0036818 A1* | 1/2019 | Nainar | H04L 45/34 |
| 2019/0114080 A1* | 4/2019 | Pydipaty | G06F 16/275 |
| 2019/0171494 A1* | 6/2019 | Nucci | G06N 20/00 |
| 2019/0190818 A1* | 6/2019 | Ceccarelli | H04L 45/52 |
| 2020/0076892 A1* | 3/2020 | Surcouf | H04L 67/1001 |
| 2020/0326981 A1* | 10/2020 | Pfister | G06F 9/505 |
| 2021/0185124 A1* | 6/2021 | Surcouf | H04L 67/1097 |

FOREIGN PATENT DOCUMENTS

| | | | |
|---|---|---|---|
| EP | 3355553 | 8/2018 | |
| EP | 3355553 A1 * | 8/2018 | H04L 45/34 |
| GB | 2549550 A * | 10/2017 | G06F 16/245 |
| WO | 20170184528 | 10/2017 | |

OTHER PUBLICATIONS

Maccormick et al., "Kinesis: A New Approach to Replica Placement in Distributed Storage Systems," Jan. 2009, Dickinson College, Dickinson Scholar, Dickinson College Faculty Publications, http://scholar.dickinson.edu/faculty_publications/664, pp. 1-29.

International Search Report and Written Opinion from the International Searching Authority, dated Nov. 19, 2019, 12 pages, for corresponding International Patent Application No. PCT/US2019/049011.

First Office Action and Search Report issued by the China National Intellectual Property Administration dated Jan. 6, 2022, 16 pages, for corresponding Chinese Patent Application No. 201980057286.8.

English Translation of Office Action for Japanese Application No. 20210507654, dated Apr. 21, 2023, 4 Pages.

International Preliminary Report on Patentability for International Application No. PCT/US2019/049011, dated Mar. 18, 2021, 8 Pages.

* cited by examiner

REDUCING DISTRIBUTED STORAGE OPERATION LATENCY USING SEGMENT ROUTING TECHNIQUES

CROSS-REFERENCE TO RELATED APPLICATIONS

This application is a continuation of U.S. application Ser. No. 17/132,125, filed on Dec. 23, 2020, which in turn, is a continuation of U.S. application Ser. No. 16/121,525, filed on Sep. 4, 2018, now U.S. Pat. No. 10,904,335, the content of which is incorporated herein by reference in their entirety.

TECHNICAL FIELD

The present technology pertains to distributed storage systems, and more specifically to reducing distributed storage operation latency using segment routing techniques.

BACKGROUND

The ubiquity of Internet-enabled devices has created an enormous demand for Internet services and content. In many ways, we have become a connected society where users are increasingly reliant on network services and content. This Internet-connected revolution has created significant challenges for content providers who struggle to service a high volume of client requests while often falling short of performance expectations. For example, content providers typically need large and complex datacenters to keep up with network and content demands from users. These datacenters are often equipped with server farms configured to host specific content and services, and include numerous network devices configured to route and process content requests. In many cases, a specific datacenter is expected to handle millions of traffic flows and content requests.

Not surprisingly, such large volumes of data can be difficult to manage and create significant performance degradations and challenges. In some cases, load balancing solutions may be implemented to improve performance and service reliability. However, current load balancing solutions are prone to node failures, often fail to adequately account for dynamic changes and fluctuations in the network, and may be susceptible to latency and bottlenecks. Additional resources can be purchased and implemented to increase the capacity of the network and thereby reduce latency and performance issues. Unfortunately, this approach is expensive, introduces added complexity to the network, and remains susceptible to network fluctuations, which can lead to latency from overload conditions, waste from underload conditions, and highly variable performance.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
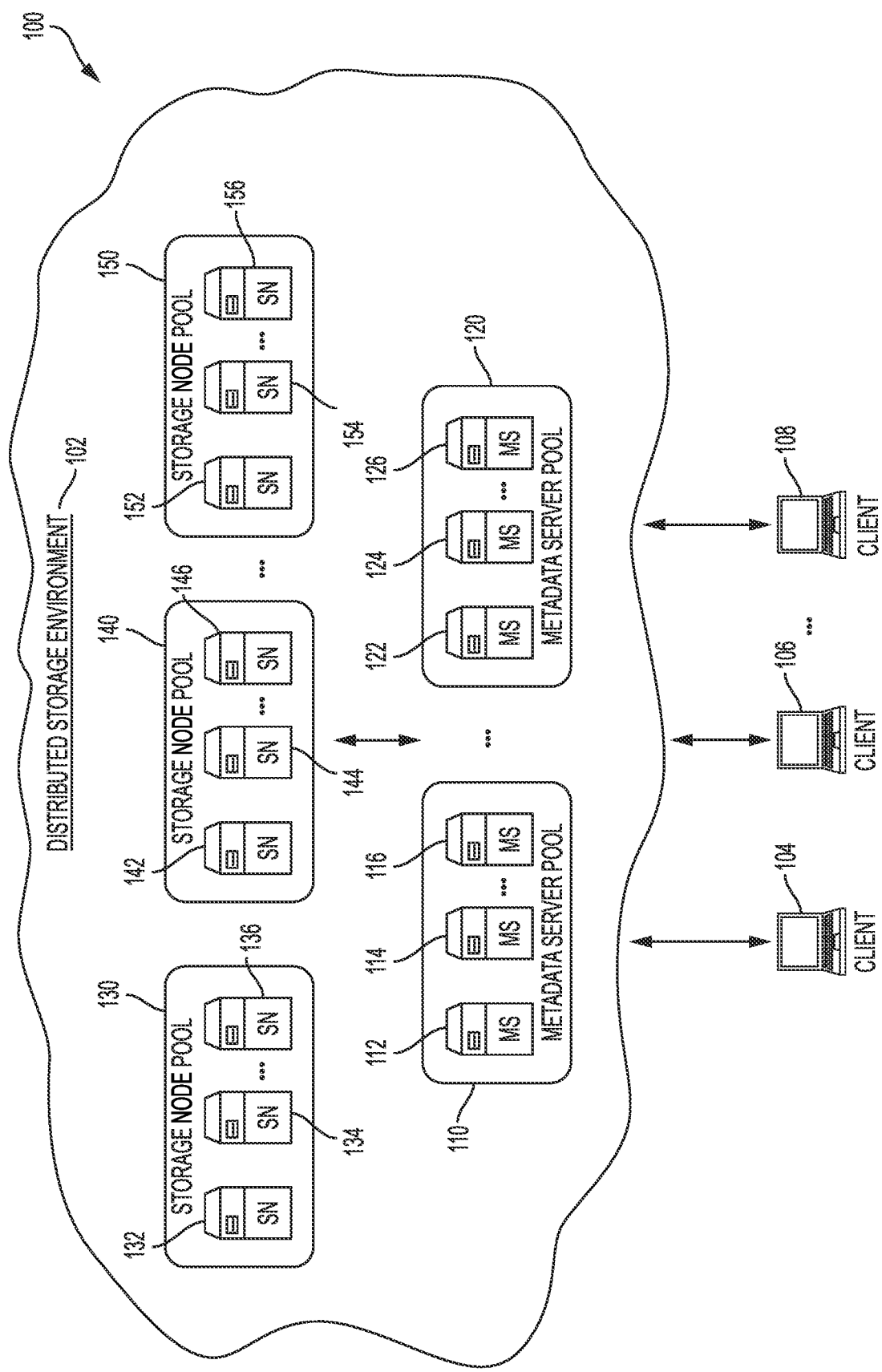
FIG. 1 illustrates an example distributed storage environment, in accordance with various embodiments.

Various embodiments of the disclosure are discussed in detail below. While specific implementations are discussed, it should be understood that this is done for illustration purposes. A person skilled in the relevant art will recognize that other components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed herein are systems, methods, and computer-readable media for reducing distributed storage operation latency using segment routing techniques. According to at least one example, a method for reducing distributed storage operation latency using segment routing techniques is provided. The method can include receiving, from a client device, a message (e.g., an electronic message such as a packet) identifying an intent to perform a data operation (e.g., read data, write data, etc.) on a distributed storage environment (e.g., a distributed storage network), and sending, to the client device, a segment routing (SR) list identifying a plurality of storage node candidates selected for performing the data operation. For example, in some cases, a metadata server on the distributed storage environment can receive an electronic message from the client device requesting to store or retrieve data on the distributed storage environment. In response to the message from the client device, the metadata server can select or identify storage node candidates in the distributed storage environment for storing or retrieving the data, and send to the client device an SR list identifying the storage node candidates. The client device can use the SR list to route or steer a data operation request through the storage node candidates using segment routing (e.g., SRv6).

The method can include steering a data operation request received from the client device through a path defined by the SR list based on a segment routing header (SRH) associated with the data operation request. For example, the client device can send a data operation request packet that includes a SRH with the SR list identifying the storage node candidates. The SRH can steer the data operation request packet through a path including the storage node candidates until a storage node from the storage node candidates accepts the data operation request. The data operation request packet can be routed to the first storage node candidate in the SR list, which upon receipt of the data operation request packet decides whether to accept or reject the data operation request. If the first storage node rejects the data operation request, it forwards the data operation request packet toward the next storage node candidate in the SR list. The next storage node candidate similarly decides whether to accept or reject the data operation request upon receiving the data operation request packet, and forwards the data operation request packet to the next storage node candidate in the SR list if it decides to reject the data operation request. The data operation request packet will continue to traverse through the path of storage node candidates in the SR list until the data operation request is accepted by a storage node candidate. Each storage node candidate can determine whether to accept or reject the data operation request based on operating conditions at the storage node candidate, such as a current bandwidth, a current load, a current capacity, an availability of resources, etc. In some cases, the last storage node candidate in the SR list can be required to accept the request to avoid the data operation request being entirely rejected or dropped.

When a storage node accepts the data operation request, the method can further include sending, to the client device, a response to the data operation request indicating that the storage node has accepted the data operation request from the client device. Once the storage node accepts the data operation request, the client device and the storage node can establish a connection to store or retrieve the data at the storage node. Here, the method can include storing the data on, or retrieving the data from, the storage node that accepted the data operation request. The storage node can accept the data operation request based on the operating conditions at the storage node, as previously explained. This can help reduce storage latency by increasing the likelihood that a data operation request will be handled by a storage node having adequate bandwidth and capacity at that particular moment, and decreasing the likelihood that the data operation request will be handled by a storage node with a low bandwidth or overload condition.

In another example, a system for reducing distributed storage operation latency using segment routing techniques is provided. The system can include one or more processors and at least one computer-readable storage medium having stored therein instructions which, when executed by the one or more processors, cause the system to performing the example method described above. For example, the instructions, when executed by the one or more processors, can cause the system to receive, from a client device, a message identifying an intent to perform a data operation (e.g., read operation, write operation, etc.) on a distributed storage environment; send, to the client device, an SR list identifying a plurality of storage node candidates selected for performing the data operation; steer a data operation request received from the client device through a path including the SR list (i.e., a path including the plurality of storage node candidates in the SR list) based on an SRH in the data operation request, which can include the SR list and can be configured to steer the data operation request through the path until a storage node from the plurality of storage node candidates accepts the data operation request; send, to the client device, a response indicating that the storage node has accepted the data operation request from the client device; and perform the data operation on the storage node that accepted the data operation request (e.g., store the data on the storage node, retrieve the data from the storage node, etc.).

In another example, a non-transitory computer-readable storage medium for reducing distributed storage operation latency using segment routing techniques is provided. The non-transitory computer-readable storage medium can store instructions which, when executed by one or more processors, cause the one or more processors to perform the method and/or operations previously described. For example, the instructions can cause the one or more processors to receive, from a client device, a message identifying an intent to perform a data operation on a distributed storage environment; send, to the client device, an SR list identifying a plurality of storage node candidates selected for the data operation; steer a data operation request received from the client device through a path including the SR list (i.e., a path including the storage node candidates in the SR list) based on an SRH in the data operation request, which includes the SR list and is configured to steer the data operation request through the path until a storage node from the plurality of storage node candidates accepts the data operation request; send, to the client device, a response indicating that the storage node has accepted the data operation request from the client device; and perform the data operation on the storage node that accepted the data operation request (e.g., store the data on the storage node, retrieve the data from the storage node, etc.).

Description

Figure 9:
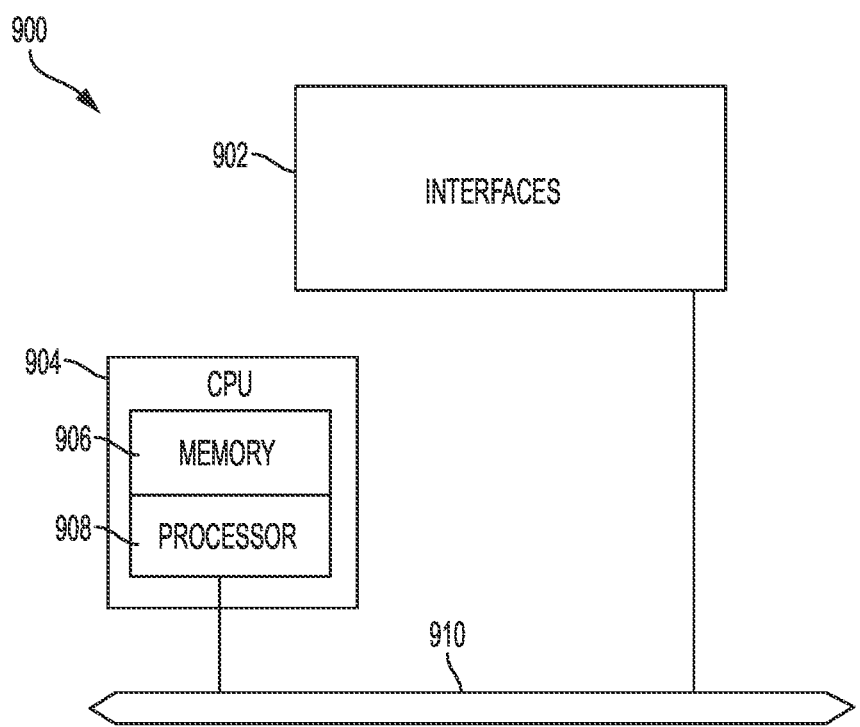
FIG. 9 illustrates an example network device in accordance with various embodiments.
Figure 10:
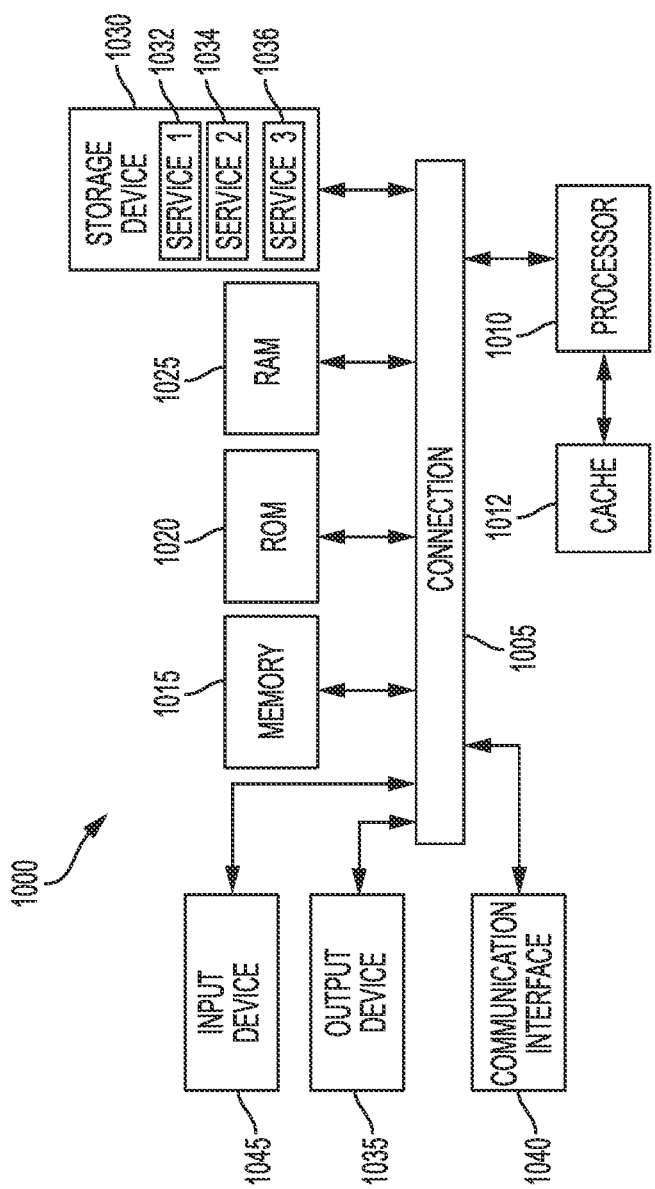
FIG. 10 illustrates an example computing device in accordance with various embodiments.

The disclosed technology involves system, methods, and computer-readable media for reducing distributed storage operation latency using segment routing techniques. The present technology will be described in the following disclosure as follows. The discussion begins with an introductory overview of load balancing storage operations using segment routing and Internet Protocol version 6 (IPv6). A description of an example distributed storage environment, as illustrated in FIG. 1, and a description of example methods and techniques for reducing distributed storage operation latency using segment routing and load balancing techniques, as illustrated in FIGS. 2 through 8C, will then follow. The discussion concludes with a description of an example network device, as illustrated in FIG. 9, and an example computing device architecture including example hardware components suitable for performing storage and computing operations, as illustrated in FIG. 10. The disclosure now turns to an introductory overview of load balancing storage operations using segment routing and IPv6.

The approaches herein can utilize segment routing (SR) to steer connection or communication requests (e.g., data read and write requests) towards multiple storage node candidates selected by a metadata server to service the requests. As described herein, the storage node candidates can receive such requests and either accept or reject the requests based on one or more factors, such as current and future loads, storage node capabilities, resource availability, performance requirements, and other operating conditions. A request will traverse through storage node candidates identified in the SR header (SRH) of the packet until a storage node accepts the request.

These approaches can similarly be implemented to efficiently store replicas of data stored by a client on a storage node. For example, the storage node that accepts a storage request and stores data from the client can use SR to steer a replica storage request towards other storage nodes or pools of storage nodes. The replica storage request can include an SRH with an SR list identifying storage node candidates from one or more pools of storage nodes. The SR list, the storage node candidates and the one or more pools of storage nodes can be identified or selected by a metadata server that stores information about storage nodes in the distributed storage environment. The SRH can steer the replica storage request through the storage node candidates until the request is accepted by a number of storage node candidates, which can correspond to the number of replicas to be stored. The storage node candidates can receive such requests and either accept or reject the requests based on one or more factors as previously mentioned. The storage node can efficiently store the replicas on those storage node candidates that accept the request.

For example, when a client device wants to store or read data on the distributed storage environment, it can send a message to a metadata server (or a pool of metadata servers as described herein), which can send to the client device a list of storage node candidates for the data. The use of multiple storage node candidates can improve reliability, performance, and load-balancing fairness. The client device can send a communication request (e.g., for reading or storing data) to the storage node candidates identified by the metadata server. The request can be routed using segment routing based on an SRH in the packet which includes an SR list identifying the storage node candidates and an order for routing the packet through the storage node candidates. The first storage node candidate in the SR list can receive the request and decide whether to accept or reject it based on one or more factors, such as a current load, a future load, a predicted load, a resource (e.g., bandwidth, storage, compute, etc.) availability, a storage node state, a performance requirement, an expected response latency, and/or any operating conditions at the storage node.

The remaining storage node candidates in the SR list can serve as backup storage candidates in case the first storage node candidate is not able to accept the request. If the first storage node candidate rejects the request, it forwards the packet to the next storage node candidate in the SR list, which similarly makes a decision to accept or reject the request. The request will continue to traverse through the SR list until a storage node candidate accepts the request or until the request reaches the last storage node candidate in the SR list which may be forced to accept the request.

To illustrate, a packet for a storage operation request can include an SRH with an SR list having segment identifiers (SIDs) corresponding to n number of storage node candidates selected for the request. The IPv6 header can include source address (SA) associated with the client, a destination address (DA) corresponding to the first storage node candidate; and an SRH including the SR list (SN3, SN2, SN1), where SN1, SN2, and SN3 are storage node candidates selected for the request. The SR list can be a list of segments in the SRH, which identify the storage node candidates selected for the request and can be used to steer the request to those storage node candidates. The storage node candidates can decide to accept or reject the request as they receive the request. In this way, IPv6 and segment routing techniques can be used to load balance storage operations and reduce latency of storage operations in a distributed storage environment. A further discussion of IPv6 and segment routing concepts is provided below.

IPv6 Environment

In an IPv6 environment, nodes, such as storage nodes or metadata servers, can be reached via an IPv6 address or prefix. The IPv6 packets can include an IPv6 header which identifies a source and destination segments for the packets, and may include functions to be applied by one or more segments in the IPv6 header. In some cases, data stored in nodes can also be assigned an IPv6 or prefix, which can be used to identify and access that data. For example, one or more nodes storing a block of data can be assigned an IPv6 prefix, and each instance of the block of data can be assigned an IPv6 address within the IPv6 prefix. The IPv6 address of the block of data can be used to access the block of data. This scheme can ensure that requests for data addressed to an IPv6 address of the data are routed to the appropriate node(s) containing the data and associated with the IPv6 prefix.

Segment Routing (SR)

SR is a source-routing paradigm which allows a packet to follow a predefined path, defined by a list of segments or SR list. The approaches herein leverage SR and IPv6 techniques for accurate and efficient storage operation load balancing and latency reduction.

SR and IPv6 can be leveraged together by implementing an IPv6 header and an SRH in a packet. For example, in some cases, an IPv6 extension header can be implemented to identify a list of segments for SR and a counter Segments-Left, indicating the number of remaining segments to be processed until the final destination of the packet is reached. In an SR packet, the IPv6 destination address can be overwritten with the address of the next segment in the SR list. This way, the packet can go through SR-unaware routers or nodes until reaching the next intended SR segment or hop. Upon receipt of an SR packet, an SR-aware router or node will set the destination address to the address of the next segment in the SR list, and decrease the Segments Left (SL) counter. When the packet reaches the last SR hop or segment in the SR list, the final destination of the packet is copied to the IPv6 destination address field. Depending on the value of a flag in the header, the SRH can be stripped by the last SR hop or segment so the destination receives a vanilla IPv6 packet.

The segment routing and IPv6 concepts herein can be implemented to perform storage operation load balancing and latency reduction. For example, when a client wants to establish a connection with a storage node to perform a storage operation (e.g., read or write), the client can communicate with a metadata server to obtain a list of storage node candidates for the storage operation. The metadata server can store information about storage nodes in the distributed storage environment to answer such requests from clients. Thus, when the metadata server receives a request from the client, it can select a set of the storage node candidates and provide the list of storage node candidates to the client. The client can then send a packet to the storage node candidates, which can be routed based on an SRH inserted in the packet which includes an SR list identifying the list of storage node candidates selected by the metadata server. The SRH will allow the packet to be steered successively through the storage node candidates.

When the packet reaches the first storage node candidate, rather than simply forwarding the packet to the storage node candidate in the SR list, the storage node candidate can locally decide whether to accept the connection or reject the connection and forward the packet to the next storage node candidate in the SR list. In some cases, the storage node candidate can make such decisions based on a policy and/or local operating conditions of the storage node candidate. If the storage node candidate rejects the connection, it can forward the packet to the next segment (i.e., the next storage node candidate) in the SR list, and the packet can traverse the storage node candidates in the SR list until a candidate accepts the connection or the packet reaches the last segment in the SR list. To ensure all requests are satisfied, the last storage node candidate in the SR list may be required to accept the connection. Upon accepting a connection, the accepting storage node candidate can establish a connection with the client and perform the storage operation requested by the client.

This mechanism allows connection requests to be transparently delivered to several storage node candidates, until finding a storage node candidate that is available or capable to accept the connection. The decision to accept or reject a connection can be made locally by the individual storage node candidate, in a decentralized fashion. This mechanism brings operational-awareness directly to the distributed storage environment, and improves the load balancing and storage operation performance across the distributed storage environment.

Replicas for data stored by a client on a storage node can similarly be routed and load balanced using the segment routing techniques herein. For example, the storage node can store a block of data and thereafter send a packet to one or more storage node candidates, in order to distribute replicas of the block of data to other storage nodes. The packet can include an SRH with an SR list identifying the storage node candidates for the replicas. The storage node candidates can, in some examples, be part of one or more pools of storage nodes selected for the replicas. The SRH can steer the packet through the segments in the SR list so the packet may be received by the storage node candidates selected for the replicas. When receiving the packet, each storage node candidate can decide to accept the request to store a replica, or reject the request and forward it to the next storage node candidate in the SR list. The storage node candidates can thus make local decisions on whether to accept the request and store the replicas based on their respective operating conditions.

The disclosure now turns to FIG. 1, which illustrates an example architecture 100 of a distributed storage environment 102, in accordance with some examples. In this example, the distributed storage environment 102 includes storage node candidates 132-136, 142-146, 152-156 for storing data in the distributed storage environment 102. The data can include, for example and without limitation, files, objects, data blocks or chunks, content items, raw data, data replicas, and/or any other type of data or information items.

The storage node candidates 132-136, 142-146, 152-156 can represent the hardware and/or virtual storage infrastructure of the distributed storage environment 102. The storage node candidates 132-136, 142-146, 152-156 can include one or more physical storage servers, one or more virtual storage servers (e.g., virtual machines (VMs), software containers, etc.), one or more physical and/or logical storage components (e.g., storage drives, logical volumes, storage partitions, storage arrays, etc.), and/or any other physical and/or virtual/logical storage element. The storage node candidates 132-136, 142-146, 152-156 can span or be distributed across multiple storage elements and can provide a distributed storage infrastructure. In some cases, a storage node can span multiple physical or virtual storage elements. For example, a storage node can represent a virtual storage device, container, or location created from two or more physical servers and/or storage devices.

The storage node candidates 132-136, 142-146, 152-156 can be grouped into storage node pools 130, 140, 150. For example, storage node candidates 132-136 can be grouped into storage node pool 130, storage node candidates 142-146 can be grouped into storage node pool 140, and storage node candidates 152-156 can be grouped into storage node pool 150. The storage node candidates 132-136, 142-146, 152-156 can be grouped into storage node pools 130, 140, 150 based on one or more factors, such as one or more common characteristics. For example, the storage node candidates 132-136, 142-146, 152-156 can be grouped into storage node pools 130, 140, 150 by storage type, type of data (e.g., the type of data they store), underlying storage platform, physical or virtual location, capacity, configuration settings or architecture, storage role, priorities, network segments (e.g., IP prefixes or subnets), shared resources, operating conditions, etc.

In some cases, a storage node pool (e.g., 130, 140, and/or 150) can be configured to function as a single storage node or distributed storage. In other cases, a storage node pool (e.g., 130, 140, and/or 150) can merely represent a collection of storage nodes which can operate separately and/or individually. For example, storage node pool 130 can represent a storage node pool selected as a primary storage node pool for storing a piece of data or serving a data request, and storage node pools 140 and 150 can represent storage node pools selected to serve as backup storage node pools (e.g., for use in case of an error or failure at the primary storage node pool, for use in load balancing, etc.) or secondary storage node pools for storing backups or replicas of the piece of data or serving backups or replicas of the piece of data.

In some cases, the storage node pools 130, 140, 150 can be dynamic such that the storage nodes in the storage node pools 130, 140, 150 can change dynamically or over time. For example, storage node pool 130 can represent a group of storage nodes selected by a metadata server (e.g., 112, 114, 116, 122, 124, and/or 126) for handling a storage operation or request. To illustrate, metadata server 112 may select storage node candidates 132, 134, 136 as candidates for handling a storage operation or request from client 104, and group storage node candidates 132, 134, 136 into a group of candidates represented by storage node pool 130. Metadata server 112 may select storage node candidates 132, 134, 136 for storage node pool 130 based on one or more factors or shared characteristics, as previously explained. For example, in this instance, metadata server 112 may select storage node candidates 132, 134, 136 for storage node pool 130 because storage node candidates 132, 134, 136 all store a piece of data being requested by client 104.

However, for future storage operations or request, metadata server 112 can select a different set of storage node candidates to form storage node pool 130. For example, metadata server 112 can increase the number of storage nodes in storage node pool 130 (e.g., by adding one or more of the storage node candidates 142-146 and/or 152-156), reduce the number of storage nodes in storage node pool 130 (e.g., by removing one or more of the storage node candidates 132, 134, and 136), or select an entirely different set of storage nodes for storage node pool 130.

The metadata servers 112, 114, 116, 122, 124, 126 can store information about the storage node candidates 132, 134, 136, 142, 144, 146, 152, 154, 156 and storage node pools 130, 140, 150 in the distributed storage environment 102, and/or track activity in the distributed storage environment 102. For example, the metadata servers 112, 114, 116, 122, 124, 126 can keep track of where data is stored within the distributed storage environment 102; where specific storage nodes are located; which storage nodes or storage node pools are processing a storage operation or request or have been selected for a storage operation or request; the addresses (e.g., IPv6 addresses, IPv6 prefixes, etc.) of the storage nodes, storage node pools, and/or data in the distributed storage environment 102; the capacity or availability of the storage nodes; the type of data or storage associated with the storage nodes; and/or any other information about the data, storage nodes, and storage node pools in the distributed storage environment 102. In some cases, different metadata servers can store or track different information or activity in the distributed storage environment 102. For example, one set of metadata servers can store and track information about a specific set of storage nodes and/or data, and another set of metadata servers can store and track information about a different set of storage nodes and/or data. This can be done, for example, to reduce the storage and/or compute burden on the metadata servers 112, 114, 116, 122, 124, 126, reduce the number of metadata servers required to keep comprehensive information for the distributed storage environment 102, etc.

The metadata servers 112, 114, 116, 122, 124, 126 can use this information to identify or select storage node candidates and/or storage node pools for storage operations or requests in the distributed storage environment 102. For example, the metadata servers 112, 114, 116, 122, 124, 126 can use this information to identify which storage nodes (e.g., 132, 134, 136, 142, 144, 146, 152, 154, 156) store a particular piece of data and select such nodes to handle a request for that particular piece of data. As another example, the metadata servers 112, 114, 116, 122, 124, 126 can use this information to identify and select storage node candidates and/or storage node pools for storing a piece of data and one or more replicas. To illustrate, the metadata servers 112, 114, 116, 122, 124, 126 can use this information to select a primary storage node pool (e.g., 130) for storing data associated with a storage request and secondary storage node pools (e.g., 140 and/or 150) for storing replicas of the data.

In some examples, when clients 104, 106, 108 want to store or retrieve data from the distributed storage environment 102, they can communicate with metadata servers 112, 114, 116, 122, 124, 126 to obtain a list of candidate storage nodes for storing or retrieving the data. The metadata servers 112, 114, 116, 122, 124, 126 can identify or select a set of candidate storage nodes for the requested operations, and provide a list of selected candidate storage nodes to each of the clients 104, 106, 108. In some cases, the list can be a SR list with segments corresponding to the selected candidate storage nodes. In other cases, the list can be a list that the clients 104, 106, 108 can use to generate the SR list.

The clients 104, 106, 108 can use the received list to establish a respective connection and complete the requested operation with a particular storage node from the list. The clients 104, 106, 108 can request to establish the connection and perform the requested operation with a respective storage node by sending a packet configured to successively travel through the candidate storage nodes in the list until a candidate storage node accepts the request. The packet can include an SRH with an SR list that includes segments corresponding to the selected candidate storage nodes. The SR list can be the list provided by the metadata servers 112, 114, 116, 122, 124, 126 or a SR list created based on the list provided by the metadata servers 112, 114, 116, 122, 124, 126. The SRH in the packet can allow SR-aware nodes or devices to steer the packet through the candidate storage nodes from the SR list.

When a candidate storage node in the SR list receives the packet, it can locally decide whether to accept or reject the request based on, for example, operating conditions (e.g., bandwidth, load, resource availability, capacity, etc.) at the candidate storage node. If the candidate storage node accepts the request, the requesting client can establish a connection with that storage node for the requested storage operation (e.g., store data, retrieve data, etc.). If the candidate storage node rejects the request (e.g., because of operating conditions at the storage node), the candidate storage node can use the SRH to forward the packet to the next hop or segment in the SR list (e.g., the next candidate storage node). Each storage node that receives the packet can similarly decide to accept or reject the packet, and either establish the connection with the requesting client or forward the packet to the next hop or segment in the SR list (e.g., the next candidate storage node), depending on whether that storage node accepted or rejected the request.

In some cases, the metadata servers 112, 114, 116, 122, 124, 126 can be grouped into metadata server pools 110, 120, which can be used to load balance requests from clients 104, 106, 108. For example, metadata servers 112, 114, and 116 can be grouped into metadata server pool 110 and metadata servers 122, 124, and 126 can be grouped into metadata server pool 120. The grouping of metadata servers 112, 114, 116, 122, 124, 126 can be used to create metadata server pools 110, 120. The metadata server pools 110, 120 can be created based on one or more factors, such as shared metadata server attributes, metadata server conditions, load balancing factors, expected metadata server loads, information stored and/or tracked by the metadata servers 112, 114, 116, 122, 124, 126, etc. For example, metadata server pool 110 can be configured to include metadata servers having information about a specific set of storage nodes, storage node pools, and/or data, and metadata server pool 120 can be configured to include metadata servers having information about a different set of storage nodes, storage node pools, and/or data. In another example, the metadata server pools 110, 120 can be configured to each include a number of randomly-selected metadata servers.

In some cases, the metadata server pools 110, 120 can be static. For example, the metadata server pools 110, 120 can be configured to include the same respective group or number of metadata servers. In other cases, the metadata server pools 110, 120 can be dynamic. For example, the number and/or identity of metadata servers in the metadata server pools 110, 120 can vary based on one or more factors, such as time, storage operation requests, metadata server operating conditions (e.g., bandwidth, availability, load, latency, etc.), storage demands, traffic fluctuations, performance preferences, priorities, performance statistics, network patterns, storage node changes, data storage adjustments, changes in the environment, etc. To illustrate, in some examples, metadata server pool 110 can implement metadata servers 112, 114, 116 for a period of time or for handling one or more specific storage operation requests, and thereafter implement more, less or different metadata servers for a different period of time, a different set of storage operation requests, indefinitely, or until a different pool adjustment trigger or criteria is encountered.

When clients 104, 106, 108 want to store or retrieve data from the distributed storage environment 102, they can send a message to one or more metadata server pools (e.g., 110 and/or 120), to obtain a list of candidate storage nodes for storing or retrieving the data. For example, client 104 can send a message to metadata server pool 110 to obtain a list of candidate storage nodes for storing or retrieving data. The message can be sent to the metadata servers 112, 114, 116 in the metadata server pool 110, and a metadata server in the metadata server pool 110 can accept the request based on operating conditions, and respond with the list of candidate storage nodes. In some cases, the packet from the clients 104, 106, 108 to the metadata server pools 110, 120 can be processed using a similar segment routing load balancing approach as the approach described above for routing and load balancing storage operation requests for candidate storage nodes.

For example, a request from client 104 to metadata server pool 110 can include a packet with an SRH containing an SR list identifying the metadata servers 112, 114, 116 in the metadata server pool 110. Based on the SRH, the packet can successively travel through the metadata servers 112, 114, 116 identified by the SR list, until a metadata server in the SR list accepts the request. When a metadata server in the SR list receives the packet, it can locally decide whether to accept or reject the request based on, for example, operating conditions (e.g., bandwidth, load, resource availability, capacity, etc.) at the metadata server. If the metadata server accepts the request, it can respond to the client 104 with the list of candidate storage nodes selected for the requested storage operation. If the metadata server rejects the request (e.g., because of operating conditions at the metadata server), the metadata server can use the SRH to forward the packet to the next hop or segment in the SR list (e.g., the next metadata server). Each metadata server that receives the packet can similarly decide to accept or reject the packet, and either respond to the client 104 or forward the packet to the next hop or segment in the SR list (e.g., the next metadata server), depending on whether that metadata server accepted or rejected the request. In this way, the client 104 can obtain the list of candidate storage nodes and store or retrieve data on one of the candidate storage nodes as described herein.

In some cases, when selecting candidate storage nodes for a client request, the metadata servers (112, 114, 116, 122, 124, 126) can select a single storage node pool for the request (e.g., 130) or multiple storage node pools (e.g., 130, 140, and/or 150). For example, assume metadata server 112 received and accepted a request from client 104 indicating an intent to store data on the distributed storage environment 102. Metadata server 112 can then select storage node pool 130 as a primary storage node pool for the request to store data, and storage node pools 140 and 150 as secondary storage node pools for the data. The secondary storage node pools can be selected for storing replicas of the data. The metadata server 112 can provide the client 104 and/or the storage node from the storage node pool 130 that accepts the storage request with a list of the candidate storage nodes in the storage node pool 140 and a list of the candidate storage nodes in the storage node pool 150.

The storage node from the storage node pool 130 that accepts the storage request can use the lists of candidate storage nodes from storage node pools 140 and 150 to store replicas on the storage node pools 140 and 150. For example, assume storage node candidate 134 accepts the storage request from client 104 and stores data received from client 104. The storage node candidate 134 can send a packet to the storage node pool 140 containing an SRH with an SR list identifying the storage node candidates 142, 144, 146 in the storage node pool 140, and a packet to the storage node pool 150 containing an SRH with an SR list identifying the storage node candidates 152, 154, 156 in the storage node pool 150. The SRHs in the packets can steer the packets successively through the storage nodes in the respective storage node pools associated with the packets (e.g., storage node pool 140 for one packet and storage node pool 150 for the other). Each storage node that receives a packet from the storage node candidate 134 can accept or reject to store the replica based on its operating conditions. If the storage node accepts the request, it can then obtain and store the replica from the storage node candidate 134. If the store node rejects the request, it can forward the packet to the next hop or segment in the SR list (e.g., the next storage node in the SR list). This way, the storage node candidate 134 can efficiently propagate replicas to the secondary storage node pools (e.g., 140 and 150).

In some cases, the metadata server 112 can provide the lists of candidate storage nodes from storage node pools 140 and 150 to the client 104, along with the list of candidate storage nodes from storage node pool 130. The client 104 can use the lists of candidate storage nodes from storage node pools 140 and 150 to inform the storage node candidate 134 where to send the replica storage requests. The storage node candidate 134 can then use the lists to store replicas on the storage node pools 140 and 150 as previously described.

Moreover, in some cases, the client 104 can use the lists of candidate storage nodes from storage node pools 130, 140 and 150 to establish parallel connections with multiple storage nodes in order to perform storage operations with those storage nodes. For example, the client 104 can use an SR spray policy or operation to duplicate a packet to multiple SR lists corresponding to the lists of candidate storage nodes from storage node pools 130, 140 and 150. For example, the client 104 can receive from the metadata server 112 lists for the storage node pools 130, 140, and 150. The client 104 can use the lists to send copies of a packet to a first SR list including storage node candidates 132, 134, 136 in storage node pool 130, a second SR list including storage node candidates 142, 144, 146 in storage node pool 140, and a third SR list including storage node candidates 152, 154, 156 in storage node pool 150. Based on the copies of the packet and the load balancing approaches previously described, the client 104 can establish a connection and perform a storage operation with storage nodes from storage node pools 130, 140, and 150. The client 104 can establish such connections in parallel and use the established connections to store copies of the data on those storage nodes from storage node pools 130, 140, and 150 that accepted the storage request from client 104.

In other examples, the storage node candidate 134 can use the lists of candidate storage nodes from storage node pools 140 and 150 to establish parallel connections with two or more storage nodes in order to store replicas on those storage nodes. For example, the storage node candidate 134 can use an SR spray policy or operation to duplicate a packet to multiple SR lists corresponding to the lists of candidate storage nodes from storage node pools 140 and 150. To illustrate, the storage node candidate 134 can obtain lists for the storage node pools 140 and 150 from the metadata server 112 or the client 104. The storage node candidate 134 can use the lists to send copies of a packet to a first SR list including storage node candidates 142, 144, 146 in storage node pool 140, and a second SR list including storage node candidates 152, 154, 156 in storage node pool 150. Based on the copies of the packet and the load balancing approaches previously described, the storage node candidate 134 can establish a connection and perform a replica storage operation with storage nodes from storage node pools 140 and 150. The storage node candidate 134 can establish such connections in parallel and use the established connections to store the replicas on those storage nodes from storage node pools 140 and 150 that accepted the request from storage node candidate 134.

Figure 2:
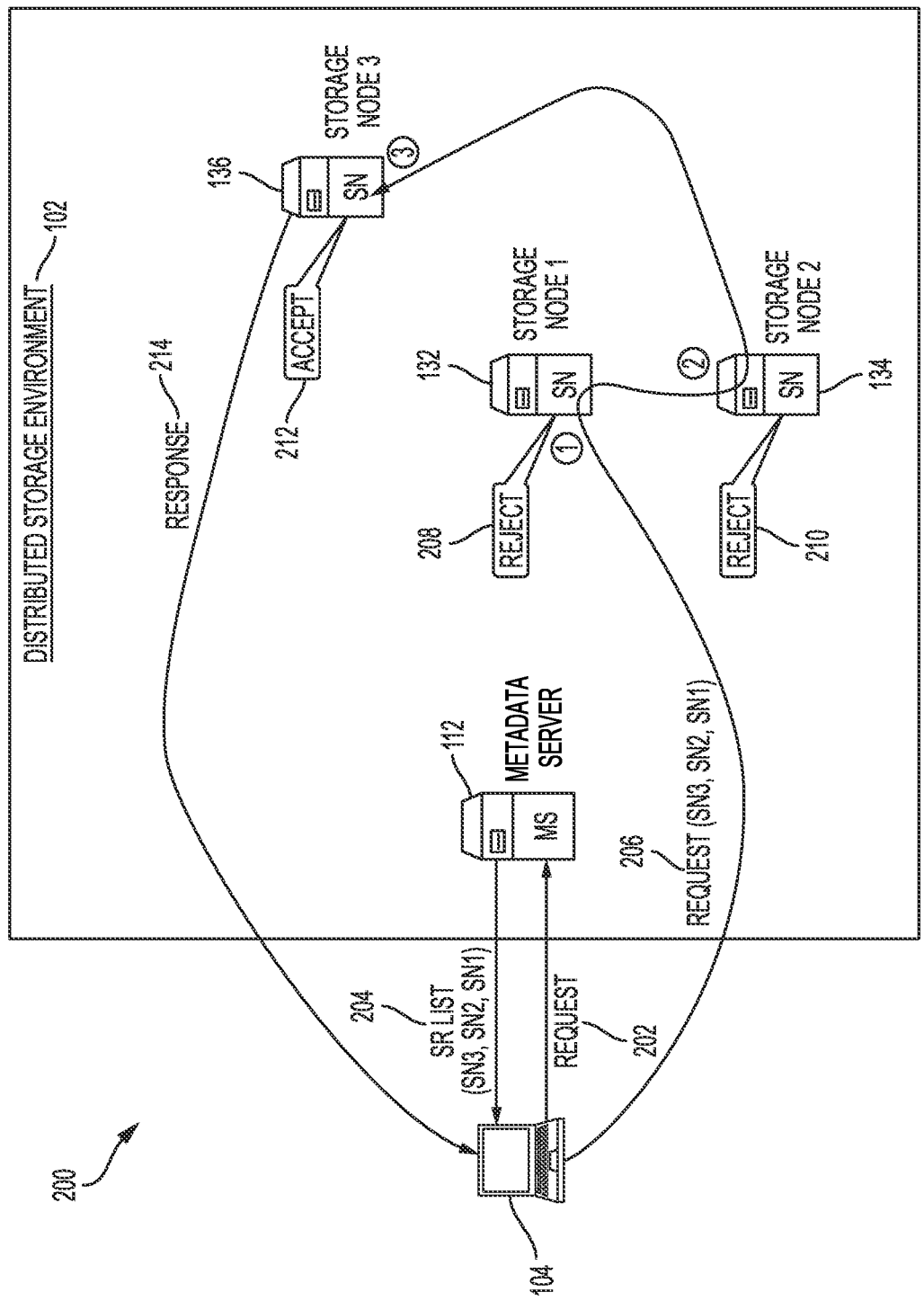
FIG. 2 illustrates a diagram of an example flow for performing a storage operation in a distributed storage environment using segment routing and load balancing techniques, in accordance with various embodiments.

FIG. 2 illustrates a diagram of an example flow 200 for performing a storage operation in the distributed storage environment 102 using segment routing and load balancing techniques. In this example, client 104 sends a request 202 to metadata server 112. The request 202 can indicate that client 104 intends to retrieve or store data on the distributed storage environment 102. The metadata server 112 receives the request 202 and selects storage node candidates 132, 134, 136 as candidate nodes for the storage operation. The metadata server 112 responds to the request 202 with the SR list 204 identifying storage node candidates 132, 134, 136. The SR list 204 can identify storage node candidate 132 as the first segment, storage node candidate 134 as the second segment, and storage node candidate 136 as the third segment for a segment routing packet.

The client 104 can receive the SR list 204 and send a request 206 to storage node candidates 132, 134, 136. The request 206 can indicate that client 104 wishes to establish a connection to store or retrieve specific data. The request 206 can be routed to the storage node candidates 132, 134, 136 based on an SRH that contains the SR list 204 identifying the storage node candidates 132, 134, 136 as the segment routing segments for the packet. Each SR-aware or capable node or router that receives the request 206 can use the SRH and SR list 204 to steer the packet toward the storage node candidates 132, 134, 136.

Since storage node candidate 132 is the first segment in the SR list 204, it will be the first storage node to receive the request 206. Upon receiving the request 206, storage node candidate 132 can determine whether to accept or reject the request 206 based on its operating conditions (e.g., bandwidth, load, capacity, resource availability, status, etc.). In this example, storage node candidate 132 rejects 208 the request 206. After rejecting the request 206, storage node candidate 132 can forward the request 206 to the next segment in the SR list 204, which in this example is storage node candidate 134. Storage node candidate 134 can similarly determine whether to accept or reject the request 206. In this example, storage node candidate 134 rejects 210 the request 206, and forwards the request 206 to storage node candidate 136, which is the last segment in the SR list 204.

Storage node candidate 136 receives the request 206 and accepts 212 the request 206. Storage node candidate 136 can accept the request 206 based on its operating conditions. For example, storage node candidate 136 can accept the request 206 based on a determination that storage node candidate 136 has sufficient (e.g., within a threshold, within a load or performance requirement, etc.) capacity, bandwidth, resource availability or can otherwise process the request 206 with limited delay or within a threshold performance. In some cases, the last segment in the SR list can be forced to accept a request it receives to avoid such request being entirely rejected. In this example, since storage node candidate 136 is the last segment in the SR list 204, it can be forced to accept the request 206 notwithstanding its operating conditions.

Once storage node candidate 136 accepts the request 206 it can send a response 214 to client 104, indicating that storage node candidate 136 has accepted the request 206. Based on the response 214, client 104 can establish a connection with storage node candidate 136 and, depending on the intent of the client 104, either store or retrieve the data associated with the request 206 on storage node candidate 136. Once the client 104 and storage node candidate 136 have established a connection, the subsequent communications associated with the request 206 can be sent directly between the client 104 and storage node candidate 136; meaning, such communications do not have to be routed through storage node candidates 132 and 134.

Figure 3A:
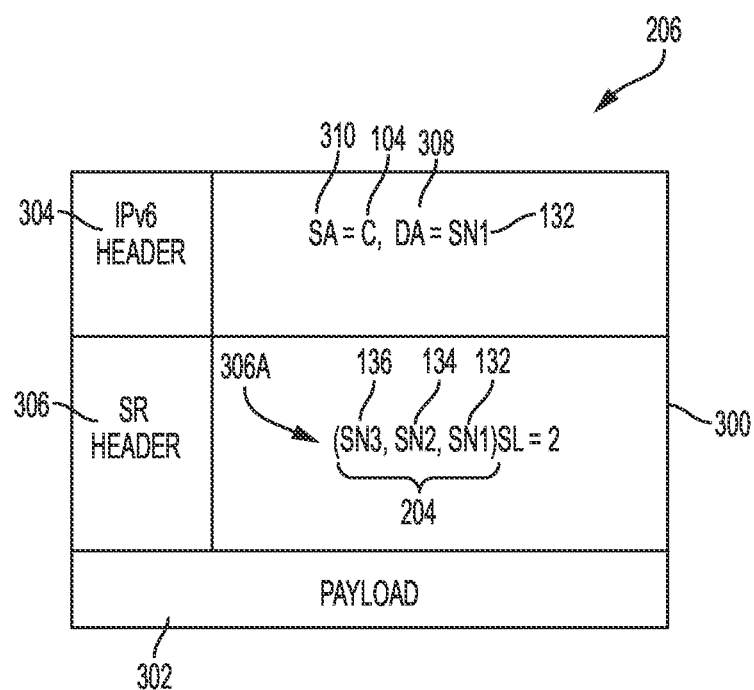
FIG. 3A illustrates an example segment routing packet for storage operation request, in accordance with various embodiments.

FIG. 3A illustrates an example SRv6 packet 300 for request 206. The SRv6 packet 300 includes a payload 302, an IPv6 header 304, and an SRH 306. The SRH 306 can include SR list 204 in a segments field 306A. SR list 204 contains a list of segments for routing the SRv6 packet 300, including storage node candidates 132 (SN1), 134 (SN2), and 136 (SN3) selected by metadata server 112 as candidates for the request 206. In some cases, the SR list 204 can also include a respective function for each segment, as further described below with reference to FIG. 3B.

The SR list 204 in the SRH 306 can be used by SR-capable or aware nodes or routers to steer the SRv6 packet 300 to the destination storage nodes (e.g., 132, 134, 136) in the SR list 204. The SR list 204 identifies SR segments (e.g., SR-capable nodes) along a path for the SRv6 packet 300. Each SR-capable node can maintain a list of SR segments instantiated at the node. The SR-capable node can use its list of SR segments to route the packet to the next segment in the SR list 204.

The segments field 306A can also include a counter, known as a SegmentsLeft (SL) counter, which identifies the active segment. The value of the counter is decreased by 1 each time it is received by an SR-capable node as the SRv6 packet 300 travels through the network.

The IPv6 header 304 can include a source address field 310 and a destination address field 308. The source address field 310 can identify the source of the SRv6 packet 300, which in this example is client 104. The source address field 310 can include a network address of the original source of the SRv6 packet 300, a return destination for the SRv6 packet 300, and/or a current source or sender of the SRv6 packet 300. The source address field 310 can also include commands or functions to be implemented by the node identified in the source address field 310, as will be further described below.

The destination address field 308 can identify the next segment or node from the SR list 204. In this example, the destination address field 308 identifies storage node candidate 132 (SN1), which is the first destination node in the SR list 204. The destination address field 308 can be used to steer the SRv6 packet 300 to the next destination. The destination address field 308 in the IPv6 header 304 can allow the SRv6 packet 300 to be routed even if the SRv6 packet 300 traverses SR-unaware nodes.

The destination address field 308 can include an IP address or prefix of the identified node or segment. For example, the destination address field 308 can include the IPv6 address or prefix of storage node candidate 132 (SN1). This can ensure that the SRv6 packet 300 is transmitted to that node or segment as the first destination for the SRv6 packet 300. After the storage node candidate 132 (SN1) in the destination address field 308 receives and processes the SRv6 packet 300, it can forward the SRv6 packet 300 to the next segment in the SR list 204, which in this example is storage node candidate 134 (SN2). When forwarding the packet, the storage node candidate 132 (SN1) can overwrite the destination address field 308 on the IPv6 header 304 to identify the storage node candidate 134 (SN2) as the destination, which ensures that the SRv6 packet 300 is routed to storage node candidate 134 (SN2) even if the SRv6 packet 300 traverses an SR-unaware node. Storage node candidate 134 (SN2) can thus receive the SRv6 packet 300 based on the destination address field 308 and the SR list 204. This way, the SR list 204 in the SRH 306 as well as the destination address field 308 in the IPv6 header 304 can be used to push the SRv6 packet 300 to the destination nodes in the SR list 204.

As will be further explained, the SR list 204 and/or destination address field 308 can include functions or commands (hereinafter "SR functions") to be implemented by associated nodes or segments. For example, the destination address field 308 can identify storage node candidate 132 (SN1) and include a function to be applied by storage node candidate 132 (SN1), such as a connect function for example. The destination address field 308 can contain the state of the SRv6 packet 300, including the next destination of the packet, the source or return node, and any commands or functions for such nodes or segments.

Similarly, the SR list 204 can include commands or functions for the segments in the SR list 204. For example, the SR list 204 can include a connect function for a segment, a force connect function for the last segment in the SR list 204, one or more parameters for one or more segments (e.g., resource identifier, flow identifier, etc.), state information, and so forth.

SR functions can encode actions to be taken by a node directly in the SRH 306 and/or the IPv6 header 304. SR functions are executed locally by the SR-capable nodes. Example SR functions include, without limitation, End function (i.e., endpoint function), End.X function (i.e., endpoint function with Layer-3 cross-connect), End.T function (i.e., endpoint function with specific IPv6 table lookup), End.S function (i.e., endpoint in search of a target in table T), End.B6 function (i.e., endpoint bound to an SRv6 policy), etc. For example, in an SR header (306) containing s::cj, s::cj denotes a path to the node s and an x-connect function (function c) to the neighbor j.

In some cases, a storage node (e.g., 132, 134, 136, 142, 144, 146, 152, 154, 156), a storage node pool (e.g., 130, 140, 150), a metadata server (e.g., 112, 114, 116, 122, 124, 126), and/or a metadata server pool (e.g., 110, 120) in the distributed storage environment 102 can be assigned an entire IPv6 prefix. Moreover, the lower-order bytes in the prefix can be used to designate SR functions. In some cases, the SR functions may depend on the address of the first segment in the SR list 204 (e.g., the "sender" of the function). To illustrate, when a node whose physical prefix is s receives a packet with the SRH 306 containing (x, . . . , s::ƒ, . . . ), the SRH 306 will trigger node s to perform a function ƒ with argument x, denoted by s.f(x).

Figure 3B:
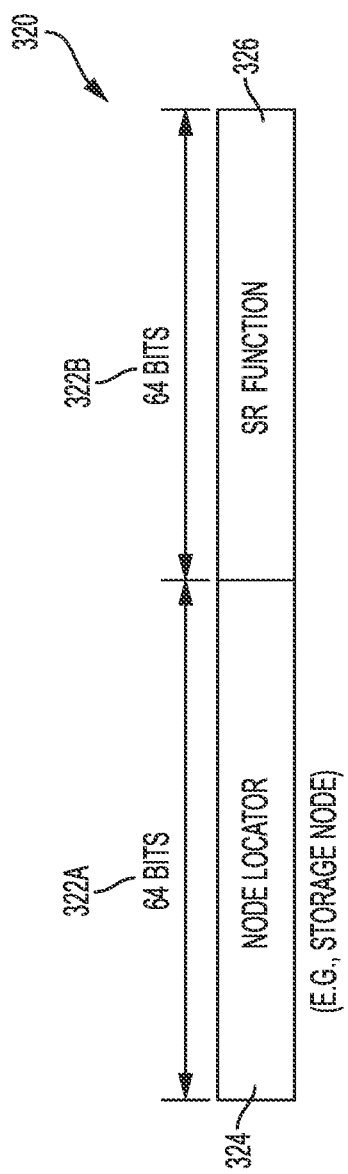
FIG. 3B illustrates an example configuration of a destination address field in an IPv6 header of a packet, in accordance with various embodiments.

FIG. 3B illustrates an example configuration 320 of destination address field 308 in IPv6 header 304. The destination address field 308 can include 128 bits, which in this example can be segmented to include a first segment 322A from the first 64 bits for the node locator 324, and a second segment 322B from the next 64 bits for an SR function 326. The node locator 324 can include the IP address or prefix of the next segment or node in the packet (e.g., 300). The SR function 326 can include a command or function associated with the node locator 324.

Figure 3C:
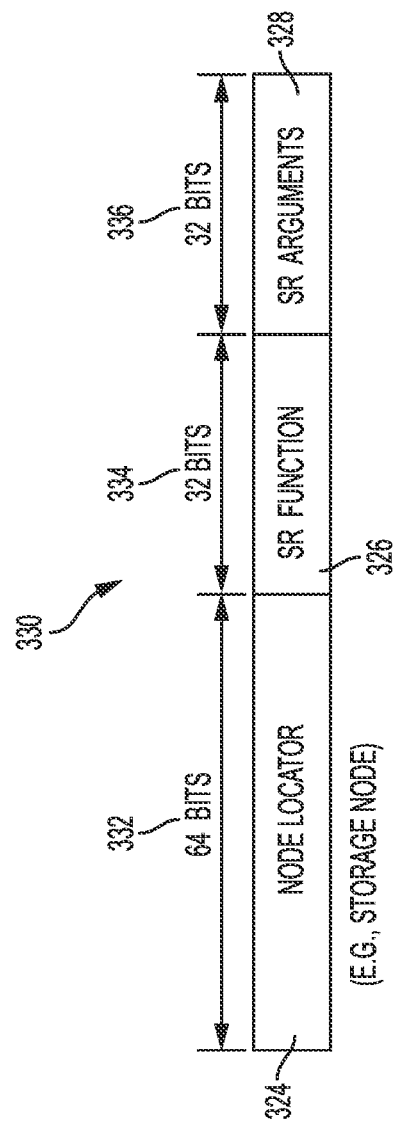
FIG. 3C illustrates another example configuration of a destination address field in an IPv6 header of a packet, in accordance with various embodiments.

While this example illustrates the destination address field 308 segmented into two segments of 64 bits, it should be noted that the destination address field 308 allows for flexible bit selection and thus can be segmented in other ways. For example, FIG. 3C illustrates another example configuration 330 of destination address field 308 in IPv6 header 304. In this example, the destination address field 308, which includes 128 bits, is segmented to include a first segment 332 from the first 64 bits for the node locator 324, a second segment 334 from the next 32 bits for SR function 326, and a third segment 336 from the next 32 bits to include any arguments 328 for the SR function 326.

In some cases, the third segment 336 can be further segmented into sub-segments which can include arguments for the SR function 326. The arguments can be used to pass specific parameters for the SR function 326.

Figure 4A:
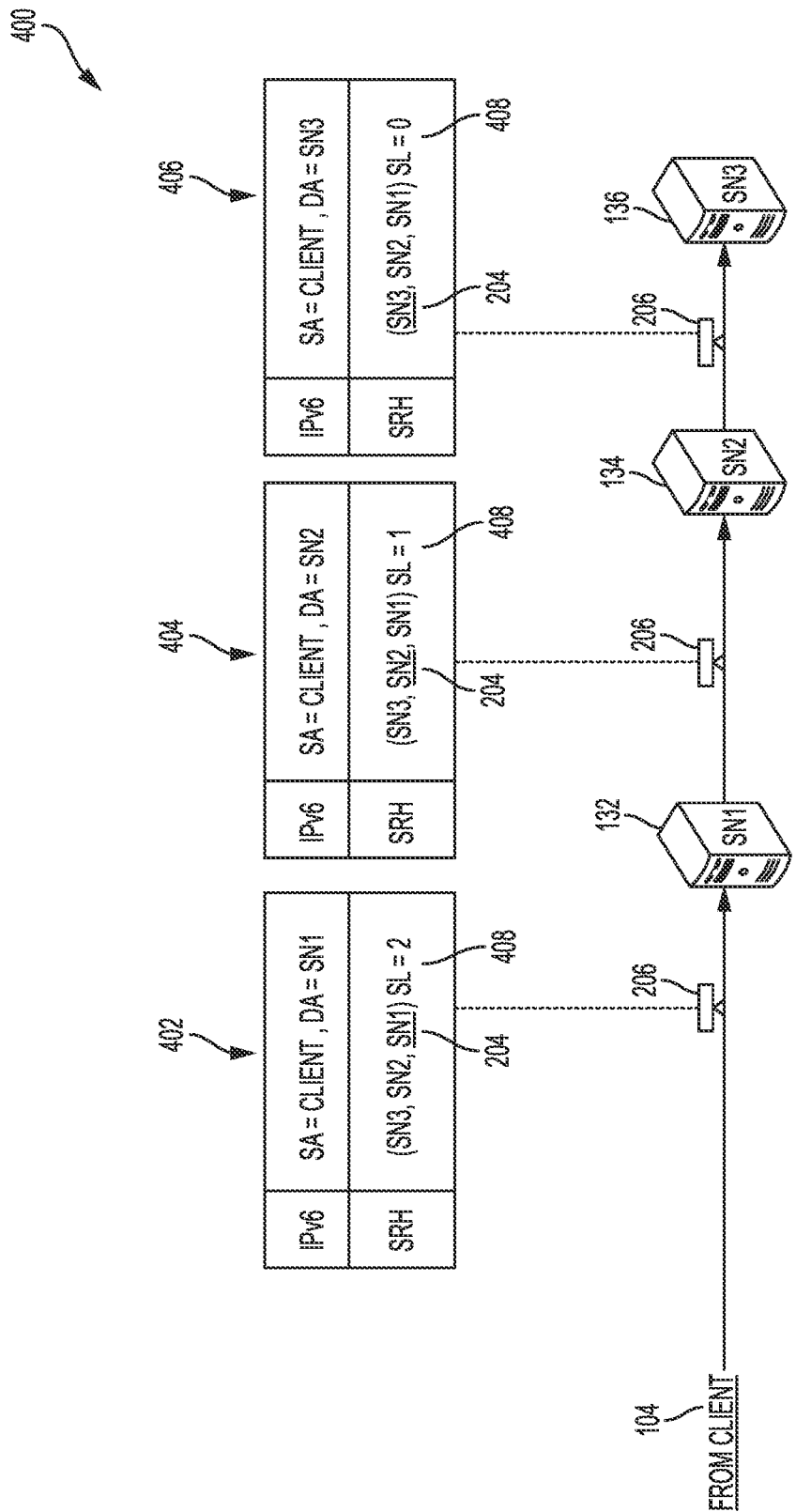
FIG. 4A illustrates an example flow of a storage operation request based on corresponding IPv6 and segment routing headers, in accordance with various embodiments.

FIG. 4A illustrates an example flow 400 of request 206 (e.g., packet 300) based on corresponding IPv6 and SRv6 headers 402, 404, 406. In this example, the client 104 sends request 206 (e.g., packet 300) to storage node candidate 132 (SN1). The request 206 can identify the client 104 as the source address, and the storage node candidate 132 (SN1) as the destination address for the request 206. The SRv6 header in the headers 402 can include SR list 204 identifying storage node candidates 132, 134, 136 as the destination segments. The SRv6 header can in the headers 402 can also include a segments left (SL) counter 408 identifying the number of remaining segments or hops in the SR list 204.

The storage node candidate 132 (SN1) can receive the request 206 and determine whether to accept or reject the request 206. If the storage node candidate 132 (SN1) rejects the request 206, it can forward the request 206 to the next segment on the SR list 204, which in this example is storage node candidate 134 (SN2). The storage node candidate 132 (SN1) can also decrease the SL counter 408 identifying the number of remaining segments or hops in the SR list 204.

The storage node candidate 134 (SN2) can receive the request 206 from the storage node candidate 132 (SN1) and determine whether to accept or reject the request 206. If the storage node candidate 134 (SN2) rejects the request 206, it can forward the request 206 to storage node candidate 136 (SN3), which is the last segment in the SR list 204. The storage node candidate 134 (SN2) can again decrease the SL counter 408 identifying the number of remaining segments or hops in the SR list 204.

The storage node candidate 136 (SN3) can receive the request 206 from the storage node candidate 134 (SN2) and process it. The storage node candidate 136 (SN3) is the last segment in the SR list 204. Accordingly, the storage node candidate 136 (SN3) can decrease the SL counter 408 to zero, without forwarding the packet to another destination.

Figure 4B:
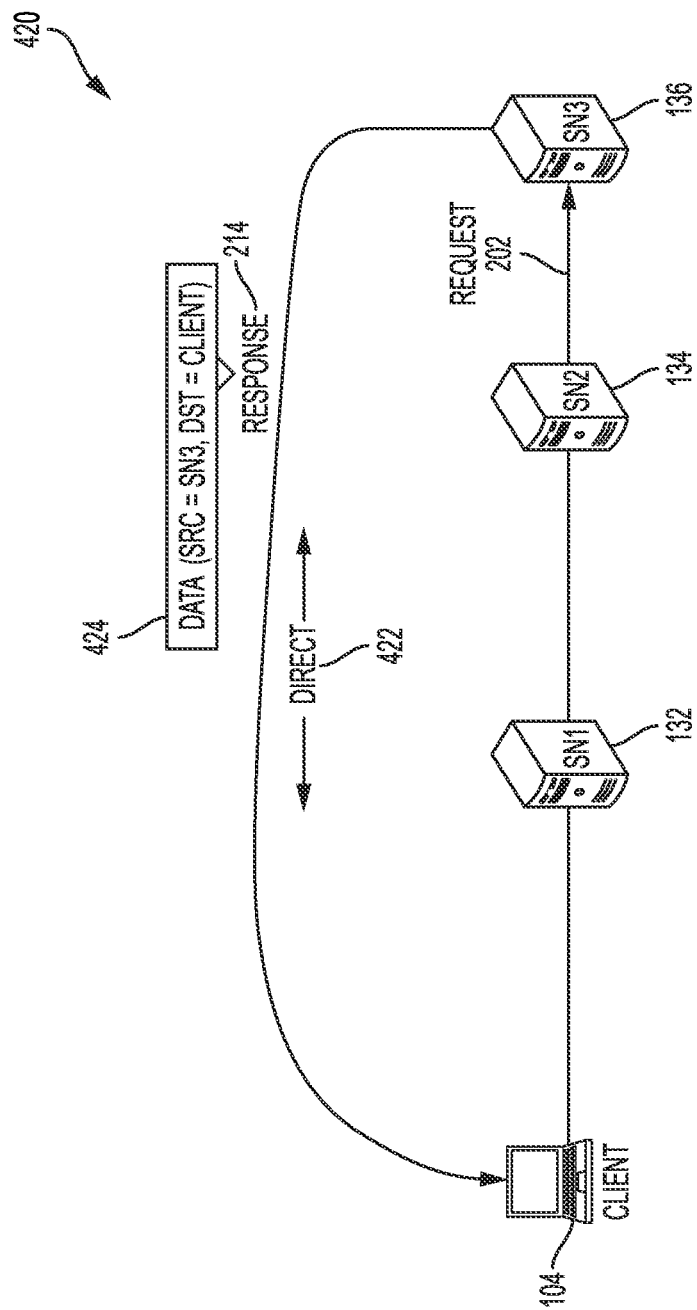
FIG. 4B illustrates an example flow of a response to a storage operation request, in accordance with various embodiments.

FIG. 4B illustrates an example flow 420 of response 214 to request 206. When storage node candidate 136 (SN3) receives and accepts the request 206 sent by client 104, it sends response 214 to client 104 to establish a direct connection 422 between client 104 and storage node candidate 136 (SN3). The direct connection 422 allows the client 104 and storage node candidate 136 (SN3) to communicate without routing their communications through storage node candidates 132 and 134. The response 214 to client 104 can include a packet 424 containing the data or payload of the response 214, and identifying storage node candidate 136 (SN3) as the source address and client 104 as the destination address.

Figure 5A:
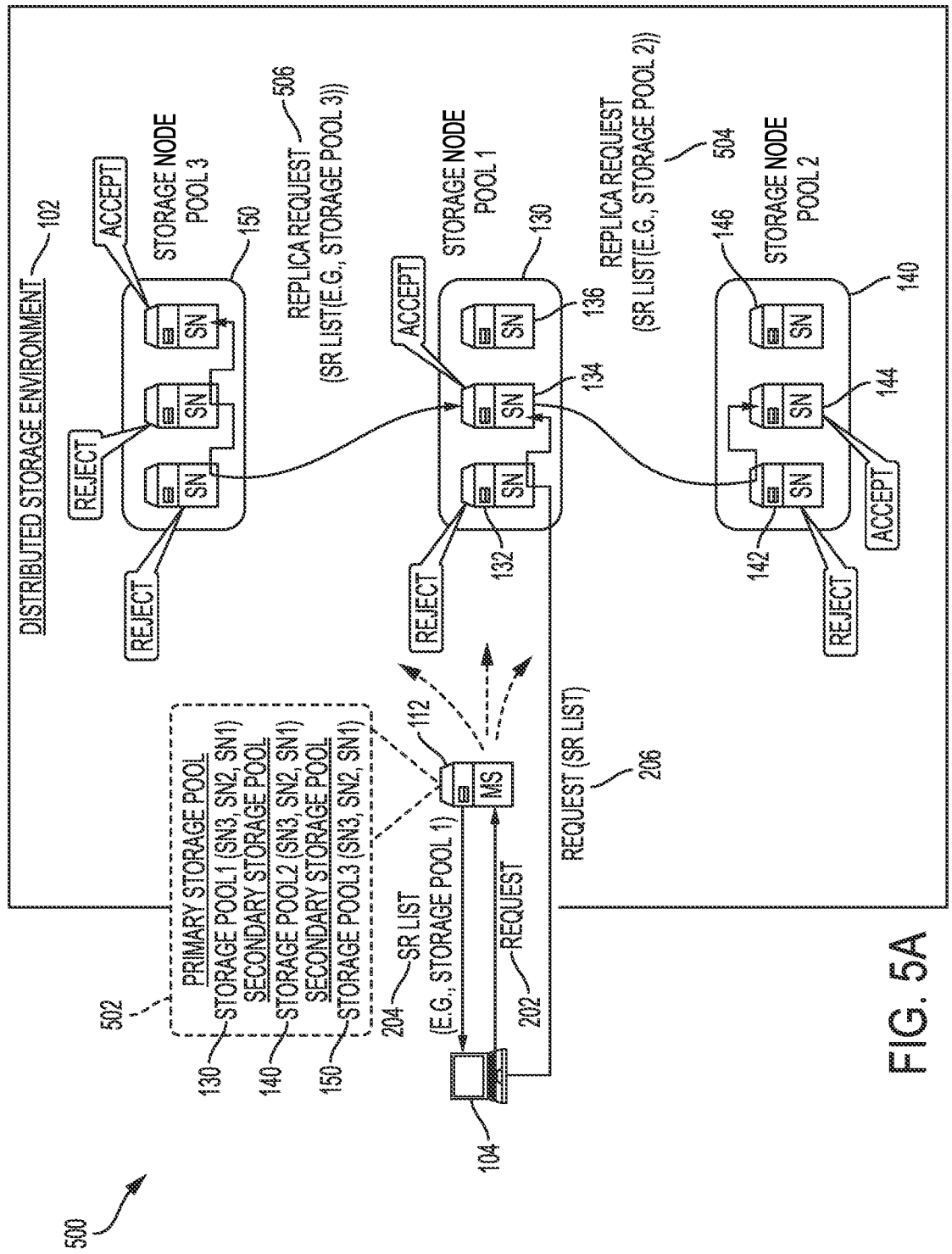
FIG. 5A illustrates a diagram of an example flow for storing data and replicas in a distributed storage environment using segment routing and load balancing techniques, in accordance with various embodiments.

FIG. 5A illustrates a diagram of an example flow 500 for storing data and replicas in the distributed storage environment 102 using segment routing and load balancing techniques. In this example, the data and replica storage process implements storage node pools 130, 140, 150 for load balancing the data and replica storage operations between candidate storage nodes (e.g., 132, 134, 136, 142, 144, 146, 152, 154, 156) in the storage node pools 130, 140, 150.

As illustrated, client 104 sends request 202 to metadata server 112. The request 202 can indicate that client 104 wants to store data on the distributed storage environment 102. In some cases, the request 202 can include a replication factor which specifies a number of replicas of the data to be stored on the distributed storage environment 102. The metadata server 112 receives the request 202 and selects storage node pool 130 with storage node candidates 132, 134, 136; storage node pool 140 with storage node candidates 142, 144, 146; and storage node pool 150 with storage node candidates 152, 154, 156, for the request 202. In this example, storage node pool 130 is selected as the primary storage node pool for the client 104 to store the data, and storage node pools 140 and 150 are selected as secondary storage node pools for storing replicas of the data.

The metadata server 112 can select the number of storage node pools (e.g., 130, 140, 150), the specific storage node pools (e.g., 130, 140, 150), the number and/or type of storage node candidates in the storage node pools, and/or the specific storage node candidates for the request 202 based on one or more factors, such as a current or predicted amount of load or traffic on the distributed storage environment 102; the amount, size, or type of data the client 104 wants to store; any performance or quality-of-service (QoS) requirements for storing the data from the client 104; a number of replicas to be stored for the data; a priority associated with the storage operation; a policy; an availability of storage nodes in the distributed storage environment 102; any specific processing requirements for the storage operation; an algorithm or load balancing scheme; a location of the client 104; one or more rules or parameters defining the number (e.g., a minimum, a maximum, a default, or any other number) and/or type of storage node pools and/or storage node candidates that should be selected; an instruction or request from the client 104; a fault tolerance or redundancy requirement for the data; and/or any other criteria or scheme. In some cases, the metadata server 112 can simply select the number and/or specific storage node pools and/or storage node candidates randomly.

The metadata server 112 responds to the request 202 with the SR list 204 identifying the storage node pools and storage node candidates selected or identified by the metadata server 112. In this example, the SR list 204 includes a set of lists 502 identifying the primary storage node pool (130) including segments corresponding to storage node candidates 132, 134, 136, the secondary storage node pool 140 including segments corresponding to storage node candidates 142, 144, 146, and the secondary storage node pool 150 including segments corresponding to storage node candidates 152, 154, 156. Instead of responding with the SR list 204, in some cases, the metadata server 112 can respond with a message identifying the storage node pools and storage node candidates selected or identified by the metadata server 112, which can then be used by the client 104 or another device (e.g., an SR-capable router or node) to create an SRH including the SR list 204 based on the storage node pools and storage node candidates identified in the message from the metadata server 112.

The client 104 can then send request 206 to the storage node candidates 132, 134, 136 in the primary storage node pool (130). The request 206 can be routed to the storage node candidates 132, 134, 136 in the primary storage node pool (130) based on an SRH containing the SR list 204. The SR list 204 can steer the packet through the storage node candidates 132, 134, 136 in the primary storage node pool (130), as previously explained.

In some cases, the client 104 can also use the set of lists 502 to inform the storage node in the primary storage node pool (130) that accepts the request 206 that storage node pool 140 including storage node candidates 142, 144, 146 and storage node pool 150 including storage node candidates 152, 154, 156 have been selected, or are to be used, for storing replicas of the data. For example, the client 104 can include in the request 206 the set of lists 502 or an indication of the storage node pools and storage node candidates from the set of lists 502 that have been selected for storing the replicas.

However, note that in some example implementations, metadata server 112 may not provide the client 104 the lists or information for the secondary storage node pools (e.g., 140 and 150) or identify to the client 104 that storage node pools 140 and 150 have also been selected for storing replicas. For example, in some cases, the metadata server 112 may not provide the set of lists 502 to the client 104 or the lists in the set of lists 502 that correspond to the secondary storage node pools (e.g., 140 and 150). Instead, the metadata server 112 may provide to the client 104 a list identifying storage node pool 130 and the storage node candidates in the storage node pool 130 (e.g., 132, 134, 136). Here, the SR list 204 may only include one list of segments corresponding to storage node candidates 132, 134, 136 in storage node pool 130. In such example implementations, the metadata server 112 may instead provide the lists for the secondary storage node pools (e.g., 140 and 150) to the storage node in storage node pool 130 that ultimately accepts the request 206 from the client 104, which the storage node can then use to store the replicas in a number of storage node candidates from the secondary storage node pools (e.g., 140 and 150). Thus, when offloading the storing of replicas to the storage node in the storage node pool 130 that ultimately accepts the request 206 from the client 104, the SR lists for the secondary storage node pools (e.g., 140 and 150) can be provided to that storage node either by the client 104 (e.g., within a message such as request 206) or by the metadata server 112 itself.

After the client 104 sends the request 206, the request 206 is routed using segment routing based on the SR list 204. Since storage node candidate 132 is the first segment in the SR list 204, it will be the first storage node candidate in storage node pool 130 to receive the request 206. Upon receiving the request 206, storage node candidate 132 can determine whether to accept or reject the request 206 based on its operating conditions (e.g., bandwidth, load, capacity, resource availability, status, etc.). In this example, storage node candidate 132 rejects the request 206. Storage node candidate 132 can reject the request 206 because, for example, it is overloaded, it has a limited bandwidth or capacity to handle the request 206, it is busy processing other operations or requests, it cannot meet certain performance or other requirements for storing the data associated with the request 206, and/or any other reason or condition that may affect the performance or capacity for storing the data associated with the request 206.

After rejecting the request 206, storage node candidate 132 forwards the request 206 to the next segment in the SR list 204, which in this example is storage node candidate 134. Storage node candidate 134 can similarly determine whether to accept or reject the request 206. In this example, storage node candidate 134 accepts the request 206. Storage node candidate 134 can accept the request 206 based on its operating conditions. For example, storage node candidate 134 can accept the request 206 based on a determination that storage node candidate 134 has sufficient (e.g., within a threshold, within a load or performance requirement, etc.) capacity, bandwidth, resource availability or can otherwise process the request 206 with limited delay, within a threshold performance, or within one or more specific requirements (e.g., QoS requirements, priorities, preferences, etc.). Since storage node candidate 134 has accepted the request 206, it does not have to forward the request 206 to the next segment in the SR list 204, which in this example is storage node candidate 136.

Once storage node candidate 134 accepts the request 206, it can send a response to client 104 indicating that storage node candidate 134 has accepted the request 206. The client 104 and storage node candidate 134 can establish a connection to store the data on the storage node candidate 134. Having accepted the request 206, storage node candidate 134 can also initiate a process for storing replicas of the data in the secondary storage node pools (140 and 150).

To store the replicas of the data in the secondary storage node pools (140 and 150), storage node candidate 134 sends a replica request 504 to storage node pool 140 and a replica request 506 to storage node pool 150. The replica request 504 can include an SRH with an SR list identifying the storage node candidates 142, 144, 146 in storage node pool 140. This SR list can be used to steer the replica request 504 through the storage node candidates 142, 144, 146 using segment routing, as previously explained. Similarly, the replica request 506 can include an SRH with an SR list identifying the storage node candidates 152, 154, 156 in storage node pool 150, which can be used to steer the replica request 506 through the storage node candidates 152, 154, 156 using segment routing.

When storage node candidate 134 sends replica request 504, the replica request is routed to the first segment in the SR list associated with the replica request 504. Since storage node candidate 142 is the first segment in the SR list associated with replica request 504, it will be the first storage node candidate in storage node pool 140 to receive the replica request 504. Upon receiving the replica request 504, storage node candidate 142 can determine whether to accept or reject the replica request 504 based on its operating conditions (e.g., bandwidth, load, capacity, resource availability, status, etc.). In this example, storage node candidate 142 rejects the replica request 504 based on its operating conditions (e.g., because of low bandwidth, a high load, insufficient capacity, lack of resource availability, a particular status, etc.). After rejecting the replica request 504, storage node candidate 142 forwards the replica request 504 to the next segment in the SR list, which in this example is storage node candidate 144. Storage node candidate 144 can similarly determine whether to accept or reject the replica request 504 based on its operating conditions. In this example, storage node candidate 144 accepts the replica request 504.

In some cases, since storage node candidate 144 has accepted the replica request 504, it may not forward the replica request 504 to the next segment in the SR list, which in this example is storage node candidate 146. However, in other cases, storage node candidate 144 may still forward a copy of the replica request 504 to the next segment in the SR list (e.g., storage node candidate 146) in order to attempt to store additional replicas in the storage node pool 140. For example, the replica request 504 may indicate that two replicas should be stored in the storage node pool 140. Accordingly, storage node candidate 144 may determine that another replica needs to be stored in the storage node pool 140. For example, storage node candidate 144 may determine that it is the only storage node in the storage node pool 140 that has accepted to store a replica (e.g., based on information within a message such as replica request 504 from storage node candidate 132, based on a query by storage node candidate 144 to storage node candidate 132 and/or storage node candidate 134, etc.), and a second replica should be stored on another storage node in the storage node pool 140.

In some cases, once storage node candidate 144 accepts the replica request 504, it sends a response to storage node candidate 134 indicating that storage node candidate 144 has accepted the replica request 504. The storage node candidate 134 and storage node candidate 144 can establish a connection to store the replica on the storage node candidate 144.

Further, when storage node candidate 134 sends replica request 506 to storage node pool 150, the replica request 506 is routed to the first segment in the SR list associated with the replica request 506. Since storage node candidate 152 is the first segment in the SR list associated with replica request 506, it will be the first storage node candidate in storage node pool 150 to receive the replica request 506. Upon receiving the replica request 506, storage node candidate 152 can determine whether to accept or reject the replica request 506 based on its operating conditions (e.g., bandwidth, load, capacity, resource availability, status, etc.). In this example, storage node candidate 152 rejects the replica request 506. After rejecting the replica request 506, storage node candidate 152 forwards the replica request 506 to the next segment in the SR list, which in this example is storage node candidate 154. Storage node candidate 154 can similarly determine whether to accept or reject the replica request 506 based on its operating conditions. In this example, storage node candidate 154 rejects the replica request 506, and thus forwards the replica request 506 to the next segment in the SR list, which in this example is storage node candidate 156.

Storage node candidate 156 then receives the replica request 506 and determines whether to accept or reject the replica request 506 based on its operating conditions. In this example, storage node candidate 156 accepts the replica request 506. In some cases, the last segment in the SR list of a request (e.g., replica request 506) can be forced to accept the request. Thus, since storage node candidate 156 is the last segment in the SR list associated with replica request 506, in such implementations it can be forced to accept the replica request 506. Here, storage node candidate 156 can accept the replica request 506 irrespective of its operating conditions.

In some cases, once storage node candidate 156 accepts the replica request 506, it sends a response to storage node candidate 134 indicating that storage node candidate 156 has accepted the replica request 506. The storage node candidate 134 and storage node candidate 156 can establish a connection to store the replica on the storage node candidate 156.

When the flow 500 is complete, the data associated with the request 206 from the client 104 will be stored on the storage node candidate 134 in storage node pool 130, and replicas of the data will be stored on the storage node candidate 144 in storage node pool 140 and the storage node candidate 156 in storage node pool 150. By using the SR lists and segment routing to store the data and replicas and allowing each storage node candidate to locally accept or reject the storage operation based on its operating conditions, this mechanism can reduce the latency of storing and replicating the data in the distributed storage environment 102, maximize the usage of resources in the distributed storage environment 102, and optimize the performance and processing of storage operations and requests.

Figure 5B:
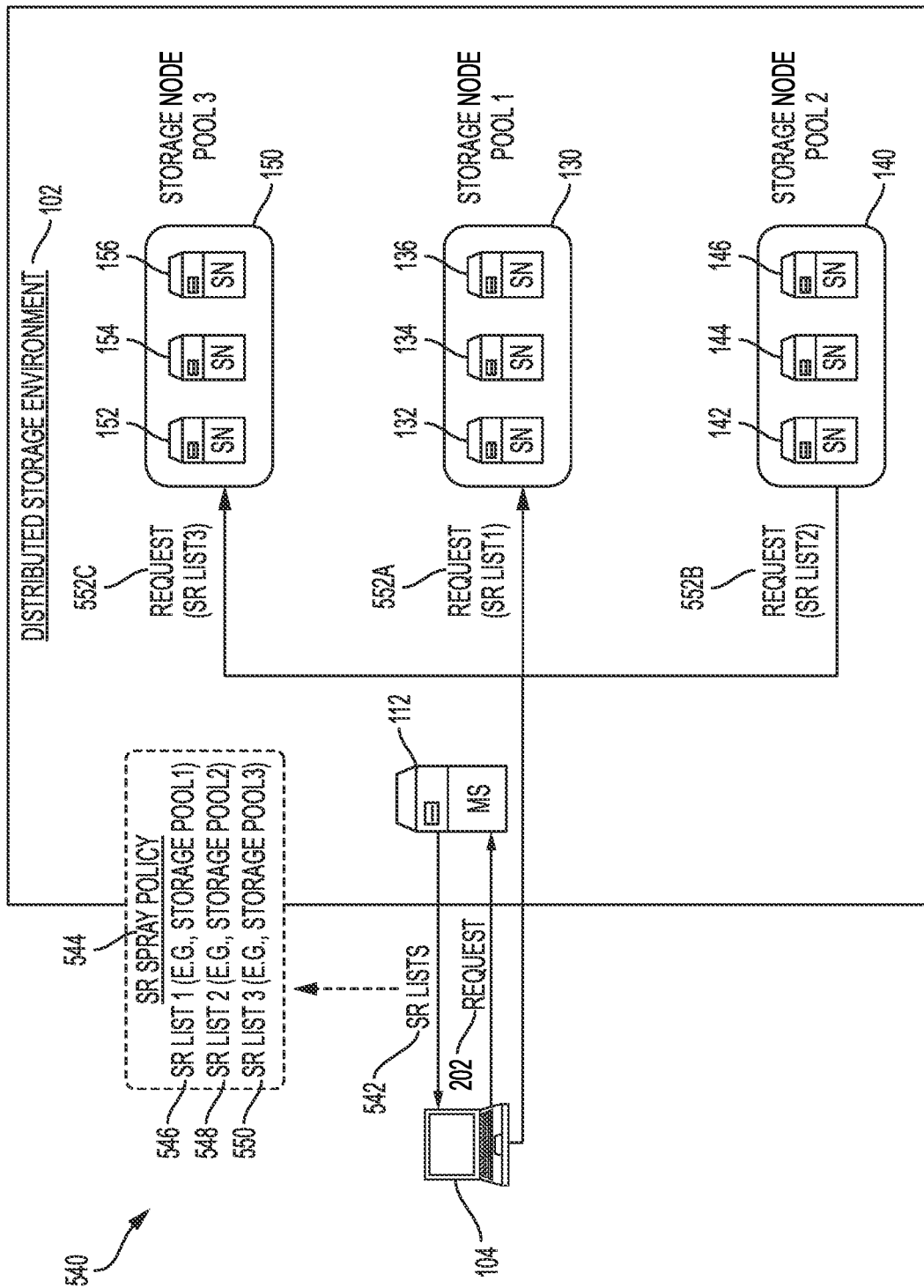
FIG. 5B illustrates a diagram of an example flow for using a segment routing spray policy to store data in a distributed storage environment, in accordance with various embodiments.

FIG. 5B illustrates a diagram of an example flow 540 for using an SR spray policy 544 to store data in the distributed storage environment 102. In this example, the SR spray policy 544 is used by client 104 to establish parallel connections with multiple storage nodes (e.g., 132, 134, 136, 142, 144, 146, 152, 154, 156) in storage node pools 130, 140, 150 for storing copies of the data in the multiple storage nodes in storage node pools 130, 140, 150. However, in other examples, an SR spray policy such as SR spray policy 544 can instead be implemented by a storage node that accepts a request to store data from the client 104 in order to establish parallel connections with multiple storage nodes for storing replicas of the data from the client 104. The flow for using an SR spray policy by a storage node to establish parallel connections and store replicas can be similar to the flow 540 implemented by the client 104 as described below.

As illustrated, client 104 sends request 202 to metadata server 112, indicating that client 104 wants to store data on the distributed storage environment 102. In some cases, the request 202 can include a replication factor which specifies a number of copies of the data to be stored on the distributed storage environment 102. The metadata server 112 receives the request 202 and selects storage node pool 130 with storage node candidates 132, 134, 136; storage node pool 140 with storage node candidates 142, 144, 146; and storage node pool 150 with storage node candidates 152, 154, 156, for the request 202.

The metadata server 112 responds to the request 202 with SR lists 542 identifying the storage node pools and storage node candidates selected or identified by the metadata server 112. In this example, the SR lists 542 include SR spray policy 544 and SR lists 546, 548, and 550. SR spray policy 544 can provide an instruction for routing duplicate copies of the storage operation request to SR lists 546, 548, and 550, in order to establish parallel connections with multiple storage nodes and perform a requested storage operation at those storage nodes.

The SR lists 546, 548, and 550 can respectively identify storage node pool 130, including segments corresponding to storage node candidates 132, 134, 136 in storage node pool 130; storage node pool 140, including segments corresponding to storage node candidates 142, 144, 146 in storage node pool 140; and storage node pool 150, including segments corresponding to storage node candidates 152, 154, 156 in storage node pool 150. Instead of responding with the SR lists 546, 548, and 550, in some cases, the metadata server 112 can respond with a message identifying the storage node pools and storage node candidates selected or identified by the metadata server 112, which can then be used by the client 104 or another device (e.g., an SR-capable router or node) to create an SRH including the SR lists 546, 548, and 550 for the SR spray policy 544.

Once the client 104 receives a response from metadata server 112, it can send requests 552A, 552B, 552C to the storage node pools 130, 140, and 150. For example, client 104 can send a request packet which can be duplicated based on the SR spray policy 544 to form requests 552A, 552B, 552C for storage node pools 130, 140, and 150. Requests 552A, 552B, 552C can then be routed to the storage node pools 130, 140, and 150 based on their respective SR lists (e.g., SR lists 546, 548, 550). For example, request 552A can be routed to storage node pool 130 based on an SRH including SR list 546, request 552B can be routed to storage node pool 140 based on an SRH including SR list 548, and request 552C can be routed to storage node pool 150 based on an SRH including SR list 550.

Request 552A is first received by storage node candidate 132 in storage node pool 130, which is the first segment in SR list 546. Storage node candidate 132 can then decide whether to accept or reject the request 552A based on its operating conditions. If storage node candidate 132 rejects the request 552A, it forwards it to the next segment in the SR list 546, which in this case is storage node candidate 134. Storage node candidate 134 then decides whether to accept or reject the request 552A. If storage node candidate 134 rejects the request 552A, it forwards it to the next segment in the SR list 546, which in this case is storage node candidate 136. Storage node candidate 136 is the last segment in the SR list 546 so, in some cases, it can be forced to accept the request 552A.

Request 552B is first received by storage node candidate 142 in storage node pool 140, which is the first segment in SR list 548. Storage node candidate 142 can then decide whether to accept or reject the request 552B based on its operating conditions. If storage node candidate 142 rejects the request 552B, it forwards it to the next segment in the SR list 548, which in this case is storage node candidate 144. Storage node candidate 144 then decides whether to accept or reject the request 552B. If storage node candidate 144 rejects the request 552B, it forwards it to the next segment in the SR list 548, which in this case is storage node candidate 146. Storage node candidate 146 is the last segment in the SR list 548 so, in some cases, it can be forced to accept the request 552B.

Request 552C is first received by storage node candidate 152 in storage node pool 150, which is the first segment in SR list 550. Storage node candidate 152 can then decide whether to accept or reject the request 552C based on its operating conditions. If storage node candidate 152 rejects the request 552C, it forwards it to the next segment in the SR list 550, which in this case is storage node candidate 154. Storage node candidate 154 then decides whether to accept or reject the request 552C. If storage node candidate 154 rejects the request 552C, it forwards it to the next segment in the SR list 550, which in this case is storage node candidate 156. Storage node candidate 156 is the last segment in the SR list 550 so, in some cases, it can be forced to accept the request 552C.

In the example above, the SR list 546 in request 552A, the SR list 548 in request 552B, and the SR list 550 in request 552C include respective segments corresponding to each storage node in a respective storage node pool (e.g., 130, 140, 150) associated with each request. However, in other implementations, the SR list in a request (e.g., SR list 546 in request 552A, SR list 548 in request 552B, and/or SR list 550 in request 552C) can include a segment corresponding to a multicast address or a prefix associated with multiple (or all) storage node candidates in a particular storage node pool (e.g., storage node candidates 132, 134, 136 in storage node pool 130) associated with the request.

For example, in some cases, the SR list 546 in request 552A can include one or more segments corresponding to SR-capable nodes or routers for steering the request to a last segment corresponding to a multicast address or IPv6 prefix associated with storage node pool 130 and/or storage node candidates 132, 134, 136 in storage node pool 130. This way, when the request 552A reaches the next-to-last segment in the SR list 546, and the SR-capable node or router corresponding to that segment forwards the request to the last segment, the request 552A will be transmitted to all the storage nodes associated with the multicast address or IPv6 prefix (e.g., storage node candidates 132, 134, 136 in storage node pool 130). The storage nodes (e.g., storage node candidates 132, 134, 136 in storage node pool 130) can then receive the request 552A and each storage node can decide whether to accept or reject the request. In some cases, if multiple storage nodes accept the request, the client 104 can establish connections to those storage nodes and store copies of the data at those storage nodes.

Figure 6A:
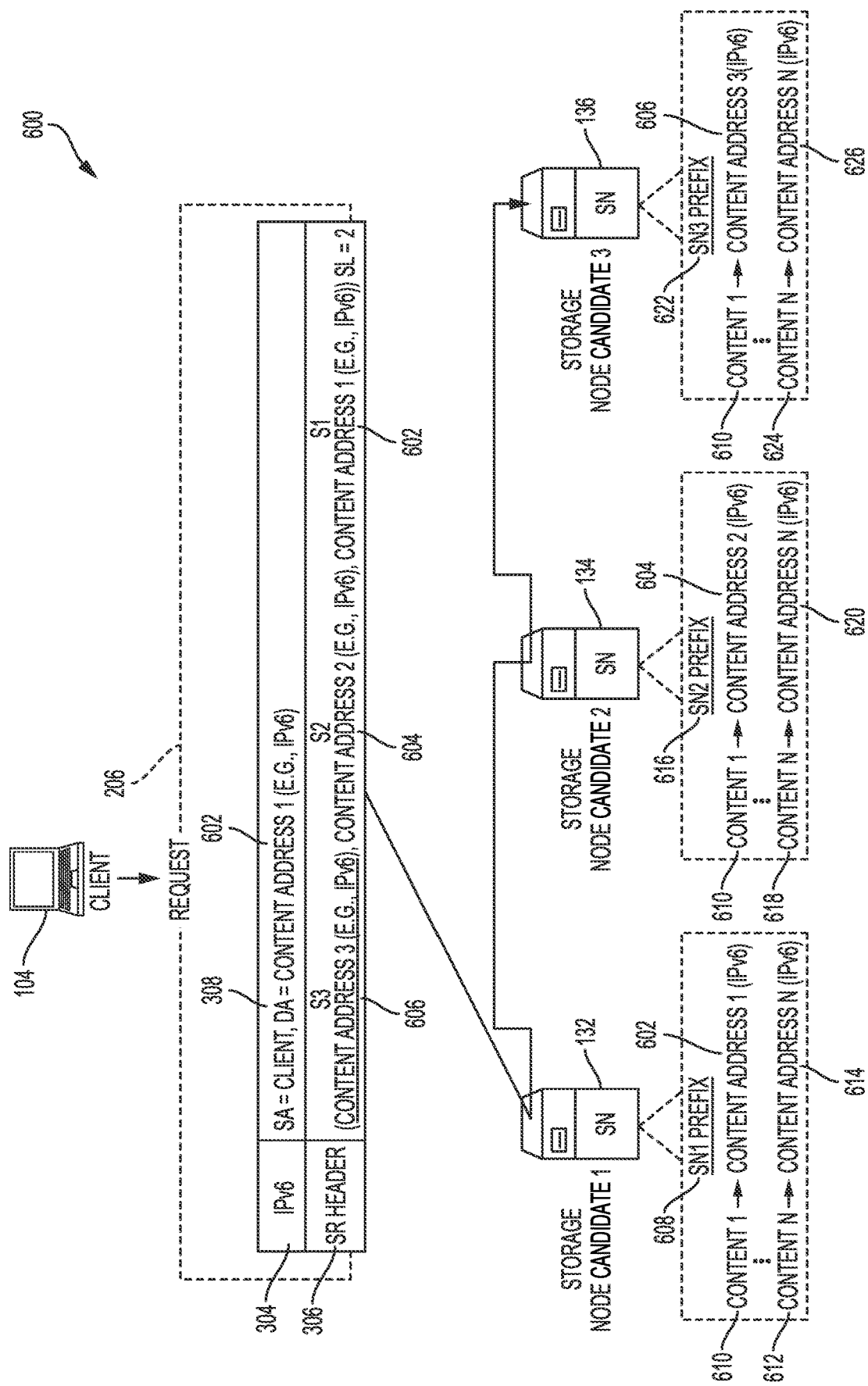
FIG. 6A illustrates a diagram of an example flow for routing data requests directly to content in a distributed storage environment using segment routing segments corresponding to addresses allocated to the content, in accordance with various embodiments.

FIG. 6A illustrates a diagram of an example flow 600 for routing data requests directly to content in the distributed storage environment 102 using SR segments corresponding to addresses allocated to the content. In this example, copies of a content item 610 are stored in storage node candidates 132, 134, and 134, and each copy has assigned or allocated a particular network address. For example, the copy of the content item 610 stored at storage node candidate 132 has network address 602, the copy of the content item 610 stored at storage node candidate 134 has network address 604, and the copy of the content item 610 stored at storage node candidate 136 has network address 606. The network addresses 602, 604, 606 can be IPv6 addresses, for example. The storage node candidates 132, 134, and 134 can also store other content (e.g., 612, 618, 624) which can similar have corresponding network addresses (e.g., 614, 620, 626).

The SRH 306 in the request 206 from the client 104 can include network addresses 602, 604, 606, which represent the list of segments for the request 206. Network address 602 corresponding to content item 610 at storage node candidate 132 can represent the first segment, network address 604 corresponding to content item 610 at storage node candidate 134 can represent the second segment, and network address 606 corresponding to content item 610 at storage node candidate 136 can represent the last segment. The destination address 308 in the IPv6 header 304 of the request 206 can be set to the first segment in the SRH 306, which in this example is network address 602.

Based on the list of segments in the SRH 306, the request 206 is first routed to network address 602, which corresponds to content item 610 on storage node candidate 132. In this example, storage node candidate 132 has a prefix 608 assigned or allocated to it, which can be used to route network traffic to the storage node candidate 132. The network address 602 can be within the prefix 608 or within a range of IP addresses in the prefix 608. Thus, communications, such as request 206, sent to network address 602 will be routed to the storage node candidate 132, allowing the storage node candidate 132 to receive and process communications addressed to network address 602 of content item 610 on storage node candidate 132. Accordingly, when the request 206 is forwarded to network address 602 based on the SRH 306, storage node candidate 132 can receive the request 206 and determine whether to accept or reject the request 206 based on the operating conditions of the storage node candidate 132.

In this example, storage node candidate 132 rejects the request 206 and thus forwards it to the next segment in the SRH 306, which in this example is network address 604 corresponding to content item 610 on storage node candidate 134. Storage node candidate 134 is allocated or assigned prefix 616. Network address 604 can be within the prefix 616 or within a range of IP addresses in the prefix 616. Thus, communications, such as request 206, sent to network address 604 will be routed to the storage node candidate 134, allowing the storage node candidate 134 to receive and process communications addressed to network address 604 of content item 610 on storage node candidate 134. Accordingly, when the request 206 is forwarded by storage node candidate 132 to network address 604, storage node candidate 134 can receive the request 206 and determine whether to accept or reject the request 206 based on the operating conditions of the storage node candidate 134.

In this example, storage node candidate 134 rejects the request 206 and thus forwards it to the last segment in the SRH 306, which in this example is network address 606 corresponding to content item 610 on storage node candidate 136. Storage node candidate 136 is allocated or assigned prefix 622. Network address 606 can be within the prefix 622 or within a range of IP addresses in the prefix 622. Thus, communications, such as request 206, sent to network address 606 will be routed to the storage node candidate 136, allowing the storage node candidate 136 to receive and process communications addressed to network address 606 of content item 610 on storage node candidate 136. Accordingly, when the request 206 is forwarded by storage node candidate 134 to network address 606, storage node candidate 136 can receive the request 206 and determine whether to accept or reject the request 206 based on the operating conditions of the storage node candidate 136. In some cases, since network address 606 is the last segment in the SRH 306, storage node candidate 136 can be forced to accept the request 206.

Figure 6B:
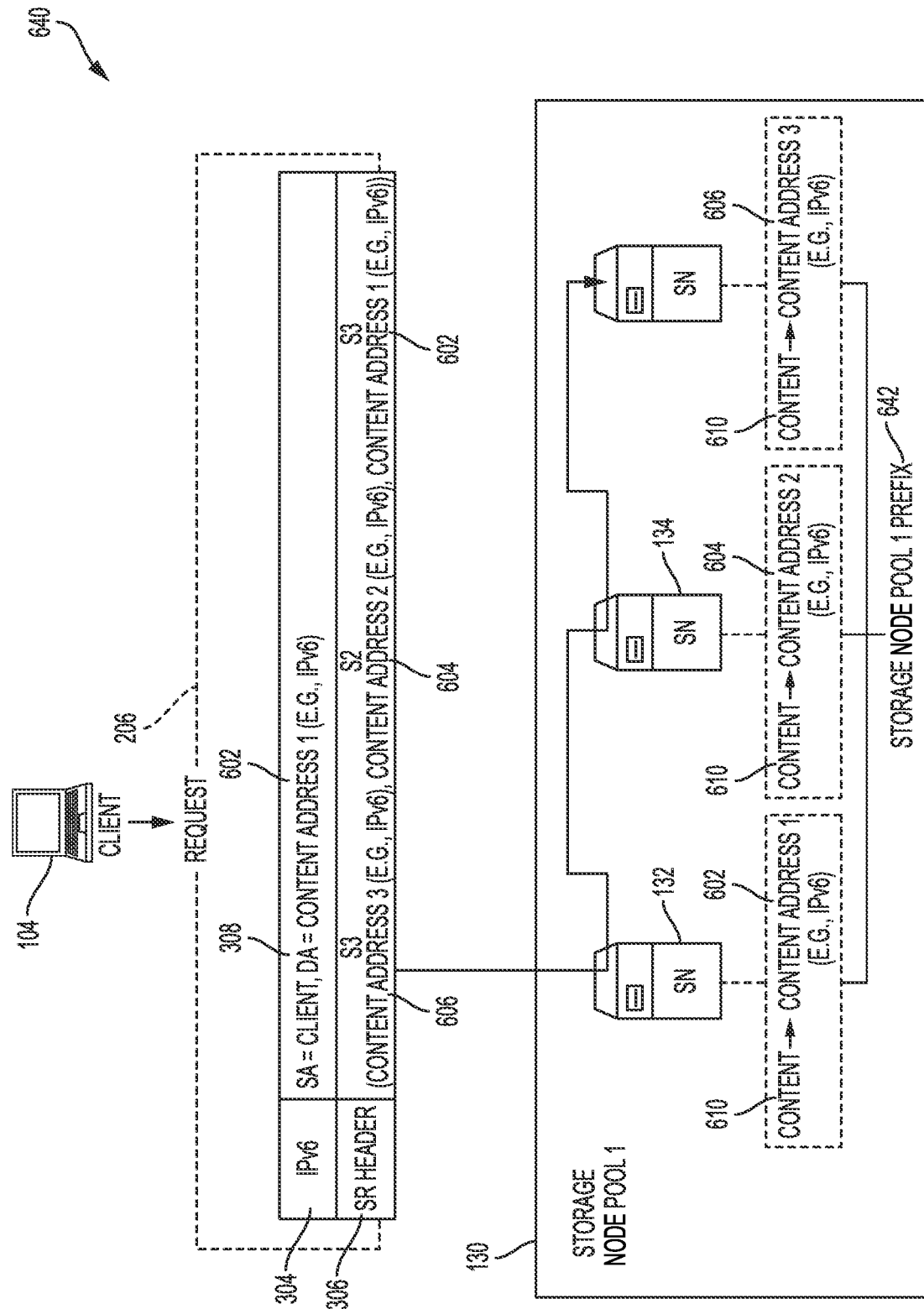
FIG. 6B illustrates a diagram of another example flow for routing data requests directly to content using segment routing segments corresponding to addresses allocated to the content, in accordance with various embodiments.

FIG. 6B illustrates a diagram of another example flow 640 for routing data requests directly to content using SR segments corresponding to addresses allocated to the content. In this example, storage node candidates 132, 134, and 136 are grouped into storage node pool 130, and the storage node pool 130 is assigned a prefix 642. Moreover, the request 206 is addressed to network addresses 602, 604, 606 corresponding to content item 610 on storage node candidates 132, 134, 136 in storage node pool 130. Network address 602 corresponding to content item 610 on storage node candidate 132 is the first segment in the list of segments on the SRH 306 of request 206. Accordingly, the request 206 is first routed to content item 610 on storage node candidate 132 (e.g., network address 602).

Network address 602 can be within the prefix 642 or within a range of IP addresses in the prefix 642. In some cases, storage node candidates 132, 134, and 136 can also be assigned or allocated prefixes overlapping with prefix 642. Thus, prefix 642 can form a supernet, for example. Communications, such as request 206, sent to network address 602 will consequently be routed to the storage node candidate 132, allowing the storage node candidate 132 to receive and process communications addressed to network address 602 of content item 610 on storage node candidate 132. Accordingly, when the request 206 is forwarded to network address 602, storage node candidate 132 can receive the request 206 and determine whether to accept or reject the request 206 based on the operating conditions of the storage node candidate 132.

In this example, storage node candidate 132 rejects the request 206 and thus forwards it to the next segment in the SRH 306, which in this example is network address 604 corresponding to content item 610 on storage node candidate 134. Storage node candidate 134 is allocated or assigned prefix 616. Network address 604 can be within the prefix 642 or within a range of IP addresses in the prefix 642. Thus, request 206 sent to network address 604 can be routed to the storage node candidate 134, allowing the storage node candidate 134 to receive and process the request 206 sent to network address 604. Accordingly, when the request 206 is forwarded by storage node candidate 132 to network address 604, storage node candidate 134 can receive the request 206 and determine whether to accept or reject the request 206 based on the operating conditions of the storage node candidate 134.

In this example, storage node candidate 134 rejects the request 206 and thus forwards it to the last segment in the SRH 306, which in this example is network address 606 corresponding to content item 610 on storage node candidate 136. Network address 606 can be within the prefix 642 or within a range of IP addresses in the prefix 642. Thus, request 206 sent to network address 606 will be routed to the storage node candidate 136, allowing the storage node candidate 136 to receive and process the request 206. Accordingly, when the request 206 is forwarded by storage node candidate 134 to network address 606, storage node candidate 136 can receive the request 206 and determine whether to accept or reject the request 206 based on the operating conditions of the storage node candidate 136. In some cases, since network address 606 is the last segment in the SRH 306 of the request 206, storage node candidate 136 can be forced to accept the request 206.

Figure 7:
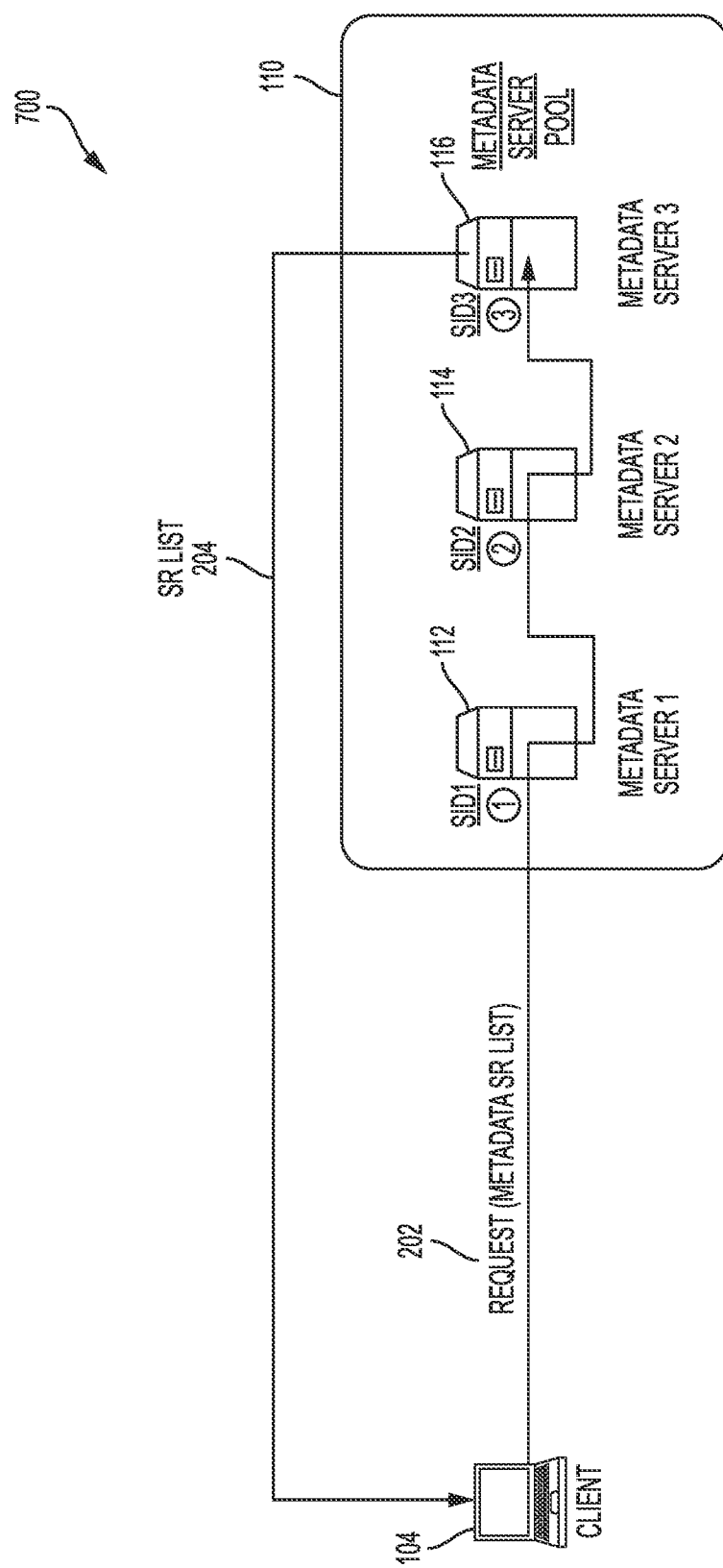
FIG. 7 illustrates an example flow for load balancing a client request between metadata servers in a metadata server pool using segment routing, in accordance with various embodiments.

FIG. 7 illustrates a flow 700 for load balancing the request 202 between metadata servers 112, 114, 116 in a metadata server pool 110 using segment routing. In this example, the client 104 sends request 202 to metadata server pool 110. The request 202 can include an SR list identifying segments corresponding to metadata servers 112, 114, 116 in the metadata server pool 110.

The request 202 is routed to, and received by, the first segment of the SR list in the request 202, which in this example is metadata server 112. Metadata server 112 receives the request 202 and determines whether to accept or reject the request 202 based on its operating conditions. In this example, metadata server 112 rejects the request 202 and thus forwards it to the next segment in the SR list, which in this example is metadata server 114.

Metadata server 114 receives the request 202 and similarly determines whether to accept or reject the request 202. In this example, metadata server 114 rejects the request 202 and forwards it to the next segment in the SR list, which in this example is metadata server 116. Metadata server 116 is the last segment in the SR list and can be forced to accept the request 202. Accordingly, metadata server 116 accepts the request 202 and sends SR list 204 to client 104 in response to the request 202. As previously described, the SR list 204 can identify one or more storage node pools and/or storage node candidates, which the client 104 can then use to send storage operation requests (e.g., request 206) as described herein.

Figure 8A:
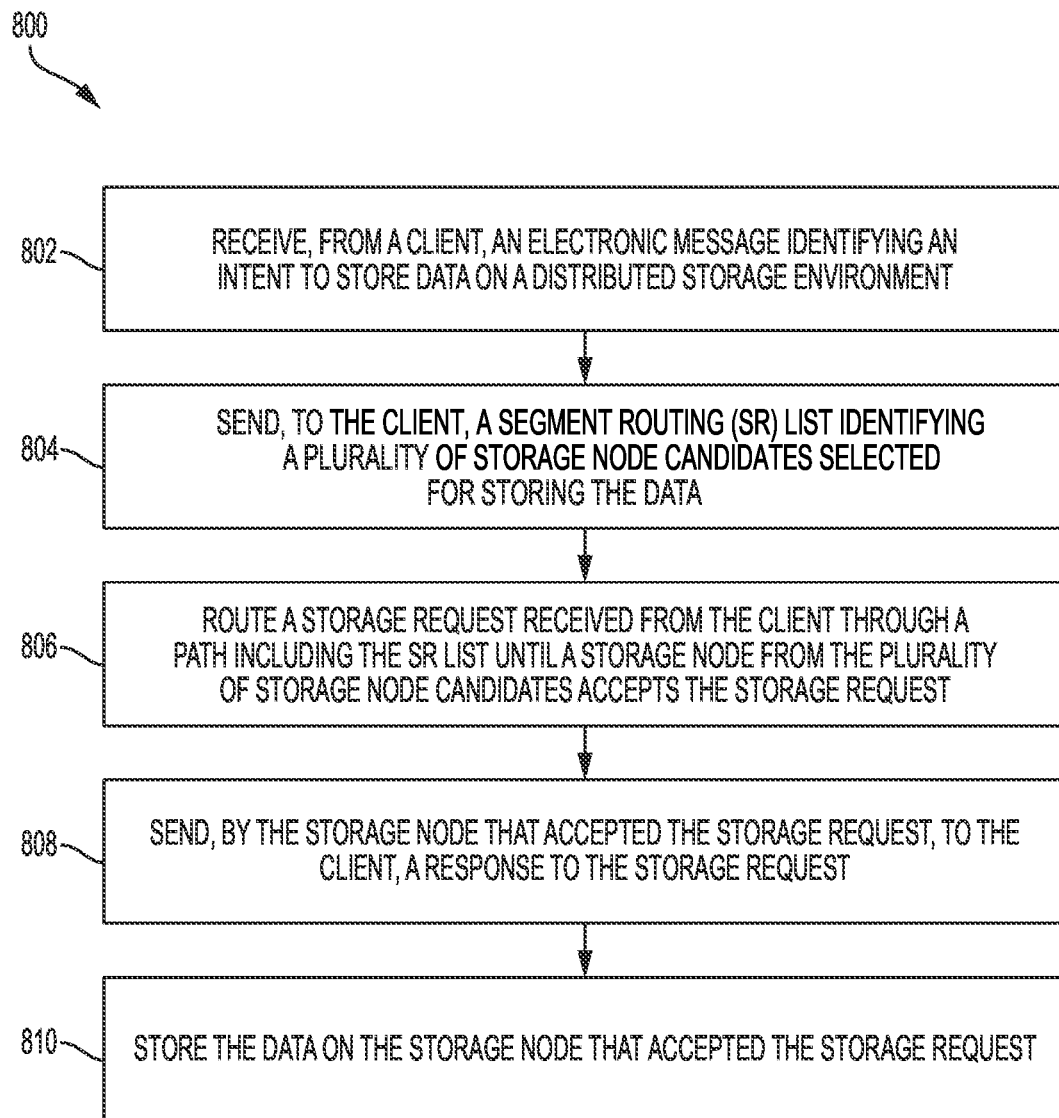
FIG. 8A illustrates an example method for storing data in a distributed storage environment using segment routing and load balancing, in accordance with various embodiments.
Figure 8B:
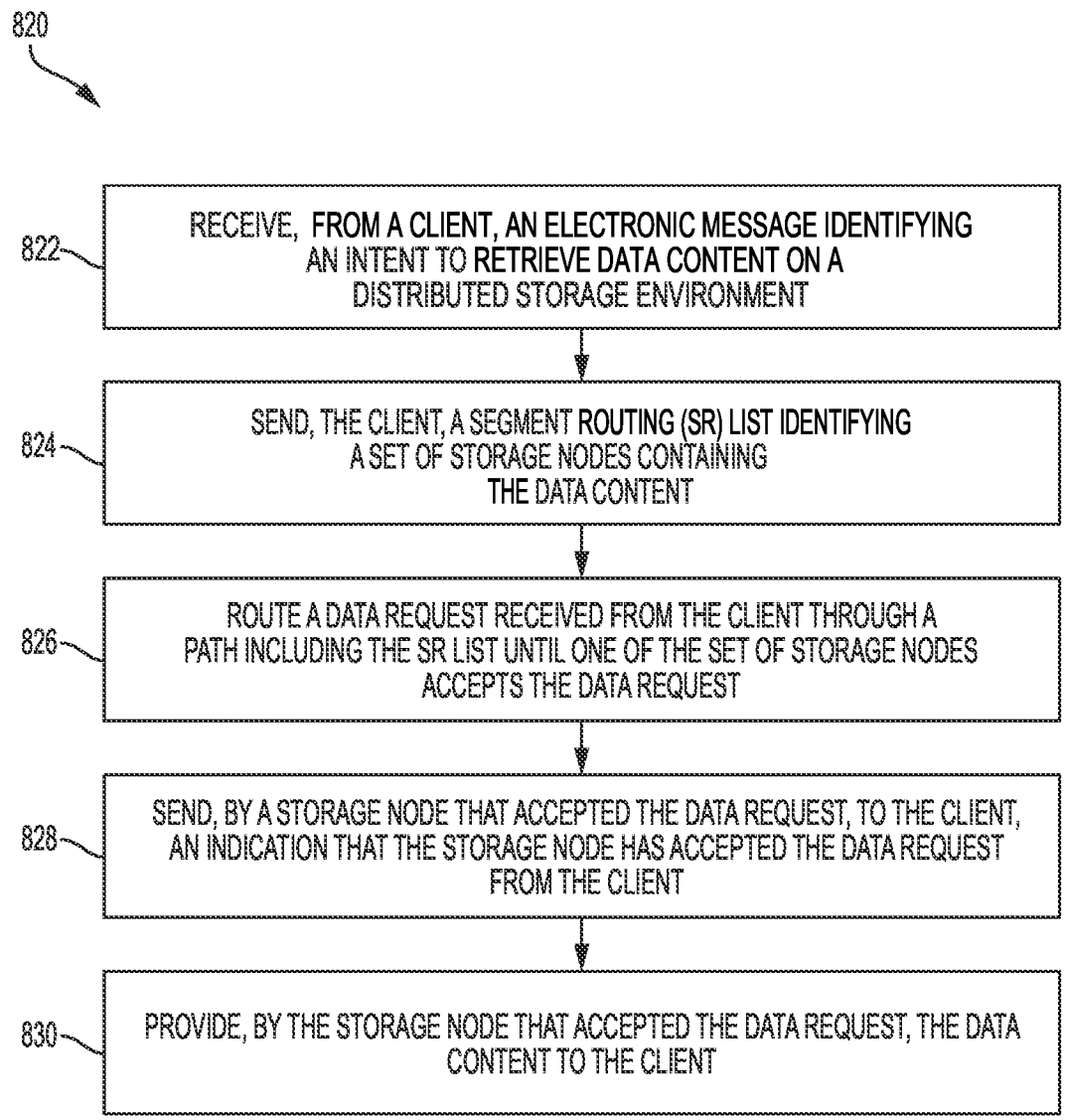
FIG. 8B illustrates an example method for retrieving data in a distributed storage environment using segment routing and load balancing, in accordance with various embodiments.
Figure 8C:
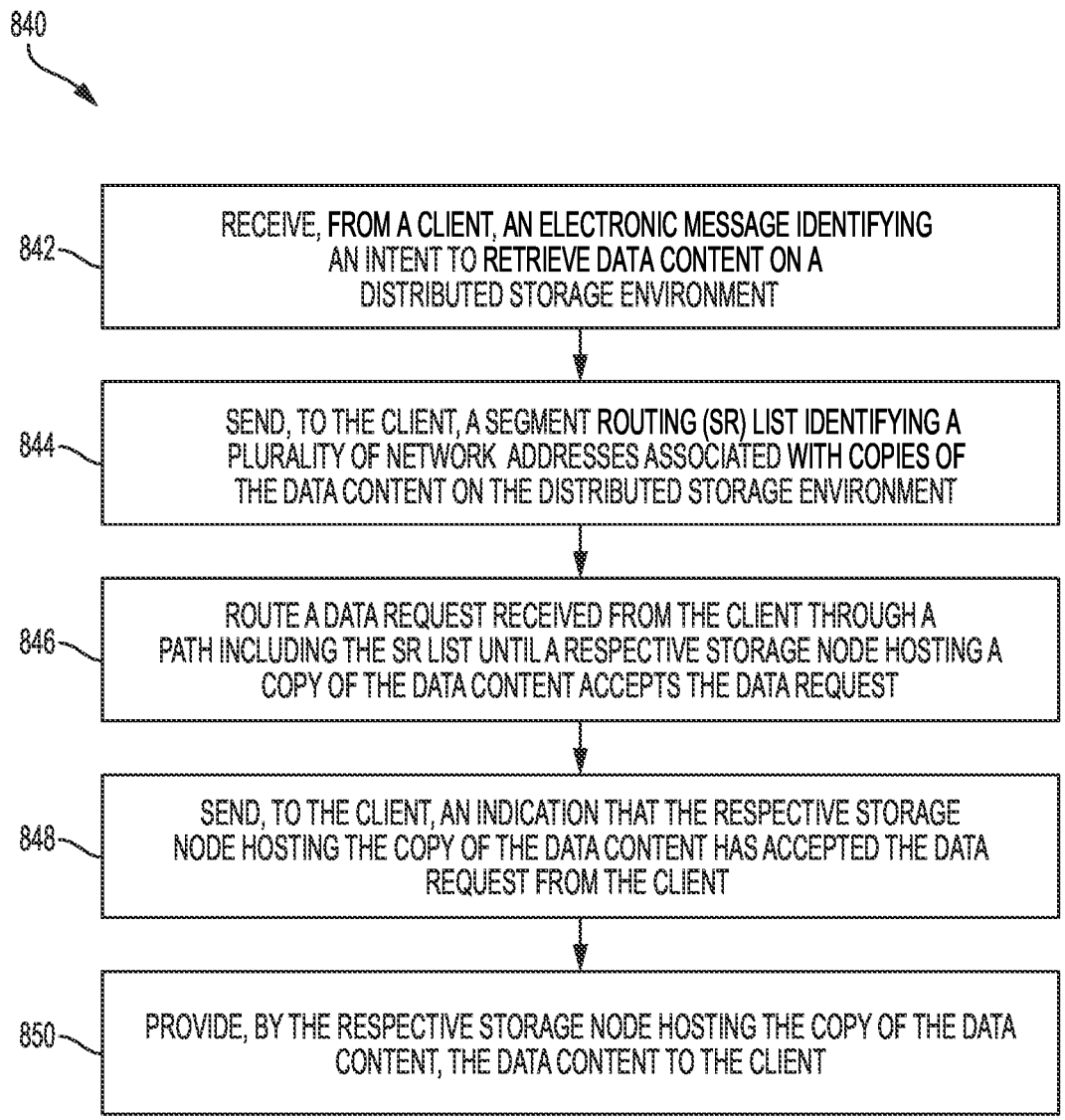
FIG. 8C illustrates an example method for using segment routing and load balancing to route requests for data directly to addresses allocated to the data, in accordance with various embodiments.

Having described example systems and concepts, the disclosure now turns to the example methods 800, 820, 840 illustrated in FIGS. 8A through 8C. For the sake of clarity, the steps in the methods 800, 820, 840 are described with reference to the clients 104, 106, 108 and distributed storage environment 102 shown in FIG. 1.

FIG. 8A illustrates an example method 800 for storing data in the distributed storage environment 102 using segment routing and load balancing. At step 802, metadata server 112 can receive, from a client (e.g., 104, 106, 108), a message (e.g., request 202) identifying an intent to store data on the distributed storage environment 102. At step 804, metadata server 112 can send, to the client (e.g., 104, 106, 108), an SR list (e.g., SR list 204) identifying a plurality of storage node candidates (e.g., 132, 134, 136, 142, 144, 146, 152, 154, 156) for storing the data. For example, in some cases, metadata server 112 can receive a message from the client requesting to store data on the distributed storage environment 102. In response to the message from the client, the metadata server 112 can select or identify storage node candidates for storing the data on the distributed storage environment 102, and send to the client an SR list identifying the storage node candidates. The client can use the SR list to route or steer a storage request through the storage node candidates using segment routing (e.g., SRv6).

At step 806, the method can involve steering or routing a storage request (e.g., request 206) sent by the client through a path defined by the SR list (e.g., SR list 204) based on a segment routing header (SRH) associated with the storage request. For example, the client can send a storage request packet that includes an SRH with the SR list identifying the storage node candidates. The SRH can steer the storage request packet through a path including the storage node candidates until a storage node from the storage node candidates accepts the storage request. Each SR-capable node or router that receives the storage request packet can forward the packet to a next segment in the SR list.

For example, the storage request packet can be routed to the first storage node candidate in the SR list, which refers to the first segment in the SR list and/or the first segment in the SR list relative to the segments corresponding to the other storage node candidates. Upon receipt of the storage request packet, the first storage node decides whether to accept or reject the request from the storage request packet. The first storage node can determine whether to accept or reject the request based on one or more factors, such as local operating conditions (e.g., bandwidth, capacity, load, status, capabilities, resource availability, etc.), the type of request, the type of data associated with the request, any preferences or requirements associated with the request (e.g., QoS requirements, priorities, etc.), etc.

If the first storage node rejects the request, it forwards the storage request packet to the next segment in the SR list, which is the next storage node candidate. The next storage node candidate similarly decides whether to accept or reject the storage request based on one or more factors such as operating conditions. If the next storage node rejects the request, it forwards the storage request packet to the next segment in the SR list, which is another storage node candidate. The storage request packet will continue to traverse through the path of storage node candidates in the SR list until the request is accepted by a storage node candidate. Each storage node candidate can determine whether to accept or reject the storage request based on one or more factors, such as local operating conditions (e.g., bandwidth, capacity, load, status, capabilities, resource availability, etc.), the type of request, the type of data associated with the request, any preferences or requirements associated with the request (e.g., QoS requirements, priorities, etc.), etc. In some cases, if the request reaches the last storage node candidate (e.g., the last segment in the SR list) without being accepted, the last storage node candidate can be required to accept the request to avoid the request being entirely rejected or dropped.

At step 808, when a storage node (e.g., 132, 134, 136, 142, 144, 146, 152, 154, or 156) accepts the request, the storage node can send, to the client, a response (e.g., response 214) to the request indicating that the storage node has accepted the request from the client. Once the storage node accepts the request, the client and storage node can establish a connection to store the data on the storage node. At step 810, the storage node that accepted the request can then store the data from the client. The storage node can accept the storage request based on the operating conditions at the storage node, as previously explained. This can help reduce storage latency by increasing the likelihood that the request will be handled by a storage node that has adequate bandwidth and capacity for that particular request, and decreasing the likelihood that the request will be handled by a storage node with a low bandwidth or overload condition, for example.

In some cases, when the metadata server 112 receives the message from the client at step 802, the metadata server 112 can select one or more storage node pools (e.g., 130, 140, and/or 150) for storing the data on the distributed storage environment 102. For example, the metadata server 112 can select a primary storage node pool (e.g., 130) for storing the data and one or more secondary storage node pools (e.g., 140 and/or 150) for storing a number of replicas of the data. The primary storage node pool can include, for example, the plurality of storage node candidates in the SR list previously described. The one or more secondary storage node pools and/or the number of storage node candidates in the one or more secondary storage node pools can be selected based on the number of replicas of the data to be stored. The number of replicas can be determined based on, for example, a replication factor. The replication factor can identify or request the number of replicas to be stored for the data. In some cases, the replication factor can be provided in the message received from the client, or determined by the metadata server 112 based on one or more criteria, such as the type of data, a priority of the data, available resources, a fault tolerance or redundancy rule, a default replica rule, a minimum and/or maximum replica rule, QoS requirement for the data, etc.

In some examples, the metadata server 112 can generate or obtain multiple SR lists (e.g., 502) associated with the primary storage node pool and the one or more secondary storage node pools. For example, the metadata server 112 create a first list identifying the storage node candidates in the primary storage node pool (e.g., 130), a second list identifying storage node candidates in a first secondary storage node pool (e.g., 140) and a third list identifying storage node candidates in a second secondary storage node pool (e.g., 150). The second and third lists can be used to route requests to store replicas on the first and second secondary storage node pools (e.g., 140 and 150). For example, the metadata server 112 can identify storage node candidates in the first and second secondary storage node pools (e.g., 140 and 150), and provide the second and third lists to the storage node that accepted the storage request for use in storing replicas. In some cases, the metadata server 112 can provide the second and third lists to the client, and the client can provide the second and third lists to the storage node that accepts the storage request (e.g., via the storage request itself or through a separate message).

The storage node that accepted the request from the client can send replica storage requests (e.g., 504 and 506) with SRHs identifying segments corresponding to the second and third lists. The replica storage requests can be routed through the first and second secondary storage node pools based on the SRHs and processed (e.g., accepted or rejected) by each recipient storage node candidate as previously explained. For example, the storage node that accepted the request from the client can send, to the first secondary storage node pool (e.g., 140), a first replica request (e.g., replica request 504) to store a first portion of a number of replicas on one or more of the storage node candidates in the first secondary storage node pool. The storage node can also send, to the second secondary storage node pool (e.g., 150), a second replica request (e.g., replica request 506) to store a second portion of the number of replicas on one or more of the storage node candidates in the second secondary storage node pool.

The first replica request can include an SRH with an SR list (e.g., the second list) identifying the storage node candidates in the first secondary storage node pool (e.g., 140), and the second replica request can include an SRH with an SR list (e.g., the third list) identifying the storage node candidates in the second secondary storage node pool (e.g., 150). The SRH in the first replica request can cause the first request to be routed through a path including the SR list in the SRH (i.e., a path through each of the storage node candidates in the first secondary storage node pool) until one or more of the storage node candidates in the first secondary storage node pool accepts the request. Similarly, the SRH in the second replica request can cause the second replica request to be routed through a path including the SR list in the SRH (i.e., a path through each of the storage node candidates in the second secondary storage node pool) until one or more of the storage node candidates in the second secondary storage node pool accepts the request.

The storage node can receive an acceptance of the first replica request from one or more storage node candidates in the first secondary storage node pool, and an acceptance of the second replica request from one or more storage node candidates in the second secondary storage node pool. For example, the storage node can receive an acceptance of the first and second replica requests from those storage node candidates in the first and second secondary storage node pools that accepted the first and second replica requests. The storage node can establish a connection with those storage nodes that accepted the first and second replica requests and store the first portion of replicas on those storage nodes in the first secondary storage node pool that accepted the first replica request and the second portion of replicas on those storage nodes in the second secondary storage node pool that accepted the second replica request. Thus, the storage node can use the second and third lists of storage node candidates selected by the metadata server 112 to establish connections with storage nodes on the secondary storage node pools and store a number of replicas on those storage nodes.

In other examples, the storage node that accepted the request from the client can use the same SR list (e.g., SR list 204) associated with the request (e.g., request 206) received from the client, as described in step 806, to replicate the data to other storage nodes. For example, the storage node can use a replication factor to determine how many replicas to store. The replication factor can indicate the number of replicas to store. The replication factor can be known by the storage node, received from another device (e.g., the client or the metadata server), or explicitly indicated in the SR list (e.g., by coding it in the addresses or segments in the SR list).

When the storage node accepts the request from the client, it can create and store the first replica. The storage node can then use the remaining segments in the SR list (e.g., the segments in the SR list after the storage node that have not received the request from the client or have not been an active segment) as a list of storage node candidates for storing the number of replicas. The storage node can use segment routing as previously described to forward a replica request to each storage node candidate in the list of storage node candidates for storing the number of replicas (i.e., each segment in the list). Each storage node candidate that receives the replica request can decide to accept or reject the replica request as described herein, and forward the replica request to the next segment in the list if that storage node rejects the replica request.

Since the replication factor is known (or otherwise coded in the SR list), to avoid creating unnecessary or unwanted replicas, information indicating that a replica has been created (e.g., the replica created by the storage node that accepted the request from the client) and/or the replication factor can be passed to any storage node candidates in the list of storage node candidates identified for storing the number of replicas (e.g., the remaining segments from the SR list in the request from the client). This way, when a storage node candidate receives a replica request, it can determine if all the number of replicas have been stored on a respective storage node and, if so, the storage node can reject the replica request to avoid exceeding the number of replicas defined by the replication factor.

Moreover, in some cases, if none of the storage node candidates in the SR list from the request from the client accepts the request from the client by the time the number of segments remaining in the SR list is equal to the number of replicas defined by the replication factor, the storage node candidates corresponding to those segments (i.e., the number of segments remaining in the SR list) can be forced to accept the request to ensure the number of replicas are stored as specified by the replication factor. Similarly, in some cases, when the storage node accepts the initial request from the client and thereafter sends a replica storage request for storing the number of replicas on other storage nodes, one or more storage node candidates in the list of storage node candidates identified for storing the number of replicas (e.g., the remaining segments from the SR list in the request from the client) can be forced to accept the replica request if necessary to be able to store the number of replicas defined by the replication factor. For example, as the replica storage request is routed through the remaining segments in the SR list, if the number of remaining storage node candidates in the SR list (i.e., the remaining segments in the SR list) is equal to the number of remaining replicas to be stored, the number of remaining storage node candidates in the SR list can be forced to accept the replica storage request to ensure that the replication factor is satisfied.

In some cases, to store data replicas on the distributed storage environment 102, the method can involve using an SR spray operation or policy (e.g., 544) to duplicate a replica storage request to different storage node candidates and/or pools and establish parallel connections with multiple storage nodes. For example, the metadata server 112 can identify multiple lists of storage node candidates as previously mentioned and provide the lists to the client or the storage node that accepted the request from the client. The multiple lists can include a second SR list identifying storage node candidates in a first secondary storage node pool (e.g., 140). In some cases, the multiple lists can also include a third SR list identifying storage node candidates in a second secondary storage node pool (e.g., 150). The client or the storage node can use the second and/or third SR lists to store data replicas using the SR spray operation or policy.

To illustrate, the client or the storage node can send a packet that is duplicated based on the SR spray operation or policy to form a first copy of a storage request and a second copy of the storage request. The SR spray operation or policy can include instructions for routing the first and second copies to the second and third SR lists. The first copy can include an SRH with the second SR list and the second copy can include an SRH with the third SR list. The first copy can be routed to the storage node candidates in the first secondary storage node pool based on the second SR list in the SRH, and the second copy can be routed to the storage node candidates in the second secondary storage node pool based on the third SR list in the SRH.

The SR spray operation or policy can configure the second and third SR lists to route the first and second copies successively through the storage node candidates in the first and second secondary storage node pools, or otherwise route the first and second copies to a first respective hop in the first and second SR lists and instruct the first respective hop to multicast the first and second copies to the first and second secondary storage node pools, respectively.

The client or storage node can receive an acceptance of the storage request from those storage nodes in the first and/or second secondary storage node pools that received the first or second copy and accepted the request in the first or second copy. In turn, the client or storage node can establish parallel connections with those storage nodes to store the data replicas at those storage nodes.

FIG. 8B illustrates an example method 820 for retrieving data in the distributed storage environment 102 using segment routing and load balancing. At step 822 the metadata server 112 can receive, from a client (e.g., 104, 106, or 108), a message (e.g., 202) identifying an intent to retrieve data content on the distributed storage environment 102. The metadata server 112 can track where each copy of data is stored in the distributed storage environment 102 and use that information to identify which storage nodes have a copy of the data content requested by the client. For example, the metadata server 112 can maintain a record of which storage nodes on the distributed storage environment 102 have a copy of the requested data content, and use that information to select storage node candidates for the data content request from the client.

At step 824, the metadata server 112 can send, to the client, an SR list (e.g., 204) identifying a set of storage nodes containing the data content. For example, the metadata server can send to the client a list of segments corresponding to the set of storage node candidates selected by the metadata server 112 for the data content request, which include at least a portion of the storage nodes in the distributed storage environment 102 that have a copy of the data content that the client may be able to retrieve.

At step 826, the method can then involve steering a data request (e.g., 206) from the client through a path including the SR list identifying the set of storage nodes, based on an SRH in the data request. The SRH can include the SR list and can be configured to steer the data request through the path until one of the set of storage nodes accepts the data request. As the data request travels through the set of storage nodes, each receiving storage node can decide whether to accept or reject the data request based on the operating conditions at the storage node, as previously explained.

At step 828, when a storage node accepts the data request, it sends, to the client, an indication (e.g., response 214) that the storage node has accepted the data request from the client. The client and the storage node can then establish a connection for the client to retrieve the data content from the storage node. Thus, at step 830, the storage node can provide, to the client, the data content requested.

FIG. 8C illustrates an example method 840 for using segment routing and load balancing to route requests for data directly to addresses allocated to the data. At step 842, the metadata server 112 can receive, from a client (e.g., 104, 106, or 108), a message (e.g., 202) identifying an intent to retrieve data content on the distributed storage environment 102. As previously explained, the metadata server 112 can track where each copy of data is stored in the distributed storage environment 102. Moreover, in the example method 840, data in the distributed storage environment 102 can have a network address (e.g., IPv6 address, IPv6 prefix, etc.) allocated to it, which can be used to identify and access that data on the distributed storage environment 102. The metadata server 112 can identify what network address is allocated to any specific copy of data, and use that information to provide to the client a list of candidate network addresses corresponding to copies of the data content requested by the client. In some cases, the message from the client can itself identify the network address or addresses of the data content requested.

At step 844, the metadata server 112 can send, to the client, an SR list identifying network addresses (e.g., IP addresses or prefixes) associated with copies of the data content on the distributed storage environment 102. For example, the metadata server 112 can send an SR list that includes a set of IPv6 addresses assigned to different copies of the requested data content. The client can use this SR list to route a request for the data content to the IPv6 addresses of the copies of the data content using segment routing.

At step 846, the method can include steering or routing a data request (e.g., 206) from the client through a path including the SR list identifying the network addresses, based on an SRH in the data request. The SRH can include the SR list and can be configured to steer the data request through the path (e.g., through each network address in the SR list) until a respective storage node hosting a copy of the data content accepts the data request. When the data request is routed to a network address associated with a segment in the SR list (i.e., the network address of a copy of the data content corresponding to a segment in the SR list), the storage node hosting the copy associated with that network address can receive the data request and determine whether to accept or reject the request as described herein.

At step 848, when a storage node hosting a copy of the data content receives and accepts the data request, it sends to the client an indication (e.g., response 214) that the storage node has accepted the data request. The storage node and client can then establish a connection for the client to retrieve the copy of the data content from the storage node using the network address assigned to the copy of the data content. Thus, at step 850, the storage node can provide to the client the copy of the data content on the storage node.

In some cases, the methods 800, 820, and/or 840 can use segment routing to similarly load balance client requests to a pool (or pools) of metadata servers (e.g., metadata server pools 110 and/or 120). This can help reduce any latency caused by an overload or limited bandwidth at a metadata server. For example, the client can send a message identifying an intent to store or retrieve data on the distributed storage environment 102. The message can include an SRH with an SR list that identifies metadata servers from one or more pools (e.g., 110, 120) of metadata servers. The SRH can cause the message from the client to be routed through a path of metadata servers in the SR list until an associated request is accepted by one of the metadata servers in the SR list. Upon receiving the message, each metadata server can decide to accept or reject the associated request based on the operating conditions at the metadata server. Thus, for example, metadata servers having a high load or limited capacity/bandwidth can reject the request to avoid latency issues, and metadata servers having a lower load or higher capacity/bandwidth can accept the request and thereby reduce potential latency issues.

The disclosure now turns to FIGS. 9 and 10, which illustrate example network devices and computing devices, such as switches, routers, nodes, metadata servers, load balancers, client devices, and so forth.

FIG. 9 illustrates an example network device 900 suitable for performing switching, routing, load balancing, and other networking operations. Network device 900 includes a central processing unit (CPU) 904, interfaces 902, and a bus 910 (e.g., a PCI bus). When acting under the control of appropriate software or firmware, the CPU 904 is responsible for executing packet management, error detection, and/or routing functions. The CPU 904 preferably accomplishes all these functions under the control of software including an operating system and any appropriate applications software. CPU 904 may include one or more processors 908, such as a processor from the INTEL X86 family of microprocessors. In some cases, processor 908 can be specially designed hardware for controlling the operations of network device 900. In some cases, a memory 906 (e.g., non-volatile RAM, ROM, etc.) also forms part of CPU 904. However, there are many different ways in which memory could be coupled to the system.

The interfaces 902 are typically provided as modular interface cards (sometimes referred to as "line cards"). Generally, they control the sending and receiving of data packets over the network and sometimes support other peripherals used with the network device 900. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master CPU (e.g., 904) to efficiently perform routing computations, network diagnostics, security functions, etc.

Although the system shown in FIG. 9 is one specific network device of the present disclosure, it is by no means the only network device architecture on which the present disclosure can be implemented. For example, an architecture having a single processor that handles communications as well as routing computations, etc., is often used. Further, other types of interfaces and media could also be used with the network device 900.

Regardless of the network device's configuration, it may employ one or more memories or memory modules (including memory 906) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 906 could also hold various software containers and virtualized execution environments and data.

The network device 900 can also include an application-specific integrated circuit (ASIC), which can be configured to perform routing and/or switching operations. The ASIC can communicate with other components in the network device 900 via the bus 910, to exchange data and signals and coordinate various types of operations by the network device 900, such as routing, switching, and/or data storage operations, for example.

FIG. 10 illustrates an example computing system architecture of a system 1000 which can be used to process data operations and requests, store data content and/or metadata, and perform other computing operations. In this example, the components of the system 1000 are in electrical communication with each other using a connection 1005, such as a bus. The system 1000 includes a processing unit (CPU or processor) 1010 and a connection 1005 that couples various system components including a memory 1015, such as read only memory (ROM) 1020 and random access memory (RAM) 1025, to the processor 1010. The system 1000 can include a cache of high-speed memory connected directly with, in close proximity to, or integrated as part of the processor 1010. The system 1000 can copy data from the memory 1015 and/or the storage device 1030 to cache 1012 for quick access by the processor 1010. In this way, the cache can provide a performance boost that avoids processor 1010 delays while waiting for data. These and other modules can control or be configured to control the processor 1010 to perform various actions. Other memory 1015 may be available for use as well. The memory 1015 can include multiple different types of memory with different performance characteristics. The processor 1010 can include any general purpose processor and a hardware or software service, such as service 1 1032, service 2 1034, and service 3 1036 stored in storage device 1030, configured to control the processor 1010 as well as a special-purpose processor where software instructions are incorporated into the actual processor design. The processor 1010 may be a completely self-contained computing system, containing multiple cores or processors, a bus, memory controller, cache, etc. A multi-core processor may be symmetric or asymmetric.

To enable user interaction with the computing system 1000, an input device 1045 can represent any number of input mechanisms, such as a microphone for speech, a touch-sensitive screen for gesture or graphical input, keyboard, mouse, motion input, speech and so forth. An output device 1035 can also be one or more of a number of output mechanisms known to those of skill in the art. In some instances, multimodal systems can enable a user to provide multiple types of input to communicate with the computing system 1000. The communications interface 1040 can generally govern and manage the user input and system output. There is no restriction on operating on any particular hardware arrangement and therefore the basic features here may easily be substituted for improved hardware or firmware arrangements as they are developed.

Storage device 1030 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1025, read only memory (ROM) 1020, and hybrids thereof.

The storage device 1030 can include services 1032, 1034, 1036 for controlling the processor 1010. Other hardware or software modules are contemplated. The storage device 1030 can be connected to the connection 1005. In one aspect, a hardware module that performs a particular function can include the software component stored in a computer-readable medium in connection with the necessary hardware components, such as the processor 1010, connection 1005, output device 1035, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A method comprising:
    receiving, at a first node, a data storage operation request from a client, the data storage operation request relating to a first piece of data;
    steering the data storage operation request through a first path defined by a list of node addresses contained in a header of a packet associated with the data storage operation request, the first path including a plurality of functions each corresponding to at least one of a plurality of function nodes, the plurality of function nodes are a subset of available functions nodes, the plurality of function nodes being selected for the list from the available function nodes based on access to the first piece of data and their known capacity for responding to the data storage operation request based on access to the first piece of data;
    responsive to receiving the data storage operation request at a first function node of the first path, determining, by the first function node, whether to accept or reject the data storage operation request based on a current state of the first function node with respect to performance of a corresponding function of the plurality of functions; and
    responsive to the first function node determining to reject the data storage operation request, forwarding the data storage operation request from the first function node to a second node identified in the list of node addresses.
2. The method of claim 1, further comprising:
    after receiving the data storage operation request at the second node, determining whether to accept or reject the data storage operation request at the second node;
    responsive to determining to accept the data storage operation request, performing the first function at a second function node.
3. The method of claim 1, wherein the first path is a segment routing (SR) list.
4. The method of claim 2, wherein the second path is a segment routing (SR) list.
5. The method of claim 3, wherein the first path is contained in a Segment Routing Header (SRH).
6. The method of claim 4, wherein the second path is contained in a Segment Routing Header (SRH).
7. The method of claim 1, wherein the first function node executes the corresponding function locally.
8. The method of claim 1, wherein the corresponding function includes at least one of reading data, writing data, or storing data.
9. The method of claim 1, further comprising:
    responsive to determining to accept the data storage operation request, performing the corresponding function at the first function node without forwarding the data storage operation request to the second node.
10. The method of claim 1, further comprising:
    responsive to determining to reject the data storage operation request, forwarding the data storage operation request to the second node without forwarding the data storage operation request to the first function node.
11. A system comprising:
    a first node configured to:
        receive a data storage operation request from a client device, the data storage operation request relating to a first piece of data;
        steer the data storage operation request through a first path defined by a list of node addresses contained in a header of a packet associated with the data storage operation request, the first path including a plurality of functions each corresponding to at least one of a plurality of function nodes, the plurality of function nodes are a subset of available functions nodes, the plurality of function nodes being selected for the list from the available function nodes based on access to the first piece of data and their known capacity for responding to the data storage operation request based on access to the first piece of data;
        responsive to receiving the data storage operation request at a first function node of the first path, determine, by the first function node, whether to accept or reject the data storage operation request based on a current state of the first function node with respect to performance of a corresponding function of the plurality of functions; and
        responsive to the first function node determining to reject the data storage operation request, send the data storage operation request to a second node in the first path identified by the list of node addresses.
12. The system of claim 11, wherein the second node is configured to:
    determine whether to accept or reject the data storage operation request; and
    responsive to determining to accept the data storage operation request, perform the corresponding function at a second function node identified by the list of node addresses.
13. The system of claim 11, wherein the list of node addresses is a segment routing (SR) list.
14. The system of claim 13, wherein the list of node addresses is included in a segment routing header (SRH).
15. The system of claim 11, wherein the first path includes one or more nodes associated with a distributed storage environment.
16. The system of claim 11, wherein the corresponding function includes at least one of reading data, writing the data, or storing the data.
17. The system of claim 11, wherein the first node is further configured to:

responsive to determining to accept the data storage operation request, perform the corresponding function without forwarding the data storage operation request to another node.

18. One or more non-transitory computer-readable media storing instructions that, when executed by one or more processors, cause the one or more processors to: receive, at a first node, a data storage operation request from a client, the data storage operation request relating to a first piece of data; steer the data storage operation request through a first path defined by a list of node addresses contained in a header of a packet associated with the data storage operation request, the first path including a plurality of functions each corresponding to at least one of a plurality of function node, the plurality of function nodes are a subset of available functions nodes, the plurality of function nodes being selected for the list from the available function nodes based on access to the first piece of data and their known capacity for responding to the data storage operation request based on access to the first piece of data; responsive to receiving the data storage operation request at a first function node of the first path, determine, by the first function node, whether to accept or reject the data storage operation request based on a current state of the first function node with respect to performance of a corresponding function of the plurality of functions; and responsive to the first function node determining to reject the data storage operation request, forward the data storage operation request from the first function node to a second node identified in the list of node addresses.

19. The one or more non-transitory computer-readable media of claim 18, wherein the instructions further cause the one or more processors to: after receiving the data storage operation request at the second node, determine whether to accept or reject the data storage operation request; responsive to determining to accept the data storage operation request, perform the first function at a second function node.

20. The one or more non-transitory computer-readable media of claim 18, wherein the first path is a segment routing (SR) list.

21. The one or more non-transitory computer-readable media of claim 19, wherein the second path is a segment routing (SR) list.

22. The one or more non-transitory computer-readable media of claim 20, wherein the first path is contained in a Segment Routing Header (SRH).

23. The one or more non-transitory computer-readable media of claim 21, wherein the second path is contained in a Segment Routing Header (SRH).

24. The one or more non-transitory computer-readable media of claim 18, wherein the first path includes one or more virtual nodes associated with a distributed storage environment.

25. The one or more non-transitory computer-readable media of claim 18, wherein the corresponding function comprising the first function includes at least one of reading data, writing the data, or storing the data.

26. The one or more non-transitory computer-readable media of claim 24, wherein the instructions further cause the one or more processors to: receive, at a metadata server, an electronic message from the client identifying an intent to perform the corresponding function; select the one or more virtual nodes from the distributed storage environment to form the first path; and send a segment routing (SR) list to the client, the SR list identifying the first path of the selected one or more virtual nodes.

* * * * *